(12) United States Patent
Belschner et al.

(10) Patent No.: US 9,344,940 B2
(45) Date of Patent: May 17, 2016

(54) METHOD AND SYSTEM FOR IMPROVEMENT OF HANDOVER QUALITY IN MOBILE RADIO SYSTEMS

(71) Applicant: DEUTSCHE TELEKOM AG, Bonn (DE)

(72) Inventors: Jakob Belschner, Frankfurt (DE); Quan Kuang, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/761,624

(22) PCT Filed: Nov. 28, 2013

(86) PCT No.: PCT/EP2013/074917
§ 371 (c)(1),
(2) Date: Jul. 17, 2015

(87) PCT Pub. No.: WO2014/111189
PCT Pub. Date: Jul. 24, 2014

(65) Prior Publication Data
US 2015/0365865 A1 Dec. 17, 2015

(30) Foreign Application Priority Data
Jan. 17, 2013 (EP) .................................... 13151566

(51) Int. Cl.
*H04W 36/00* (2009.01)
*H04L 12/26* (2006.01)
(Continued)

(52) U.S. Cl.
CPC .............. *H04W 36/20* (2013.01); *H04L 43/16* (2013.01); *H04W 36/08* (2013.01); *H04W 72/1226* (2013.01); *H04W 36/0072* (2013.01)

(58) Field of Classification Search
CPC .... H04W 84/045; H04W 36/20; H04W 16/10
USPC .......................... 455/436, 443; 370/248, 252
See application file for complete search history.

(56) References Cited

U.S. PATENT DOCUMENTS 8,437,786 B1 * 5/2013 Wand .................... H04W 16/18
455/443
8,588,781 B2 * 11/2013 Belschner ......... H04W 36/0083
455/436

(Continued)

OTHER PUBLICATIONS

"3rd Generation Partnership Project; Technical Specification Group Radio Access Network; Evolved Universal Terrestrial Radio Access (E-UTRA) and evolved Universal Terrestrial Radio Access Network (E-UTRAN); Overall description; Stage 2 (Release 10)", 3GPP Draft; 36300-A90, Jan. 7, 2013, XP050664756.

(Continued)

*Primary Examiner* — Thomas Lett
(74) *Attorney, Agent, or Firm* — Leydig, Voit & Mayer, Ltd.

(57) ABSTRACT

A handover method includes the steps: (1a) detecting, at a serving node, signal quality of a signal transmitted from the serving node to a user equipment (UE) being worse than a predefined threshold; (1b) identifying, at the serving node, node(s) transmitting to the UE the strongest signals interfering with signals being transmitted to the UE; (1c) sending, by the serving node, a request for starting an inter-cell interference coordination scheme; (1d) rescheduling, by the node(s) identified in step (1b), users currently being served by the node(s); (1e) informing, by the node(s) identified in step (1b), the serving node of the UE which resources have, been reserved in step (1d); (1f) scheduling, by the serving node, the UE to the resources reserved in step (1d); (1g) starting, by the serving node, handover of the UE from the serving node to a target node; and (1h) completing the handover of the UE.

16 Claims, 22 Drawing Sheets

(51) Int. Cl.
*H04W 36/20* (2009.01)
*H04W 36/08* (2009.01)
*H04W 72/12* (2009.01)

(56) References Cited

U.S. PATENT DOCUMENTS

| | | | |
|---|---|---|---|
| 2012/0315935 A1 | 12/2012 | Wang Helmersson et al. | |
| 2013/0279355 A1* | 10/2013 | Sadek | H04L 1/0026 370/252 |
| 2014/0071836 A1* | 3/2014 | Panchal | H04W 72/1205 370/248 |

OTHER PUBLICATIONS

A. Damnjanovic, J. Montojo, Y. Wei, T. Ji, T. Luo, M. Vajapeyam, T. Yoo, O. Song, and D. Malladi, "A survey on 3GPP heterogeneous networks," IEEE Wireless Communications, vol. 18, No. 3, pp. 10-21, Dec. 2011.
S.-P. Yeh, S. Talwar, G. Wu, N. Himayat, and K. Johnsson, "Capacity and coverage enhancement in heterogeneous networks," IEEE Wireless Communications, vol. 18, No. 3, pp. 32-38, Dec. 2011.
R. Y. Kim, I. Jung, X. Yang, and C.-C. Chou, "Advanced handover schemes in imt-advanced systems [WiMAX/LTE update]," IEEE Communications Magazine, vol. 48, No. 8, pp. 78-85, Dec. 2010.
Y. Lee, B. Shin, J. Lim, and D. Hong, "Effects of time-to-trigger parameter on handover performance in SON-based LTE systems," in Proc. 16th Asia-Pacific Conf. Communications (APCC), Dec. 2010, pp. 492-496.
K. Dimou, M. Wang, Y. Yang, M. Kazmi, A. Larmo, J. Pettersson, W. Muller, and Y. Timner, "Handover within 3GPP LTE: Design principles and performance," in Proc. IEEE 70th Vehicular Technology Conf. Fall (VTC 2009—Fall), Dec. 2009, pp. 1-5.
Z. Liu, P. Hong, K. Xue, and M. Peng, "Conflict avoidance between mobility robustness optimization and mobility load balancing," in Proc. IEEE Global Telecommunications Conf. (GLOBECOM 2010), Dec. 2010, pp. 1-5.
D. Lopez-Perez, I. Guvenc, and X. Chu, "Mobility enhancements for heterogeneous networks through interference coordination," in Proc. IEEE Wireless Communications and Networking Conf. Workshops (WCNCW), Dec. 2012, pp. 69-74.
R. Madan, J. Borran, A. Sampath, N. Bhushan, A. Khandekar, and T. Ji, "Cell association and interference coordination in heterogeneous LTE-A cellular networks," IEEE J. Sel. Areas Commun., vol. 28, No. 9, pp. 1479-1489, Dec. 2010.
I. Guvenc, "Capacity and fairness analysis of heterogeneous networks with range expansion and interference coordination," IEEE Communications Letters, vol. 15, No. 10, pp. 1084-1087, Dec. 2011.
I. Guvenc, M.-R. Jeong, I. Demirdogen, B. Kecicioglu, and F. Watanabe, "Range expansion and inter-cell interference coordination (ICIC) for picocell networks," in Proc. IEEE Vehicular Technology Conf. (VTC Fall), Dec. 2011, pp. 1-6.
Y. Wang and K. I. Pedersen, "Performance analysis of enhanced intercell interference coordination in LTE-advanced heterogeneous networks," in Proc. IEEE 75th Vehicular Technology Conf. (VTC Spring), Dec. 2012, pp. 1-5.
D. Aziz and R. Sigle, "Improvement of LTE handover performance through interference coordination," in Proc. IEEE 69th Vehicular Technology Conf. VTC Spring 2009, Dec. 2009, pp. 1-5.
G. Hui and P. Legg, "LTE handover optimisation using uplink ICIC," in Proc. IEEE 73rd Vehicular Technology Conf. (VTC Spring), Dec. 2011, pp. 1-5.
3GPP, "Evolved universal terrestrial radio access (e-utra) and evolved universal terrestrial radio access network (e-utran); overall description (TS 36.300)," Jul. 2012.
3GPP, "Evolved universal terrestrial radio access (e-utra); physical layer; measurements (TS 36.214)," Apr. 2011.
3GPP "Evolved universal terrestrial radio access (e-utra); radio resource control (RRC); protocol specification (TS 36.331)," Jul. 2011.
3GPP "Evolved universal terrestrial radio access (e-utra); mobility enhancements in heterogeneous networks (TR 36.839)," Feb. 2012.
3GPP "Evolved universal terrestrial radio access (e-utra); requirements for support of radio resource management (TS 36.133)," Jun. 2011.
3GPP, Working Group Radio Layer 1, "Document R1-104968: Summary of the Description of Candidate eICIC Solutions", available at http://www.3gpp.org/ftp/tsg_ran/wg1_rl1/TSGR1_62/Docs/R1-104968.zip, Aug. 2010.

* cited by examiner

METHOD AND SYSTEM FOR IMPROVEMENT OF HANDOVER QUALITY IN MOBILE RADIO SYSTEMS

CROSS-REFERENCE TO RELATED APPLICATIONS

This application is a U.S. National Phase application under 35 U.S.C. §371 of International Application No. PCT/EP2013/074917, filed on Nov. 28, 2013, and claims benefit to European Patent Application No. EP 13151566.0, filed on Jan. 17, 2013. The International Application was published in English on Jul. 24, 2014 as WO 2014/111189 A1 under PCT Article 21(2).

FIELD

The present invention is related to an interference coordination method to aid the handover process. In particular, the invention is related to an interference coordination method aiming at improving the signal quality of the radio link to increase the probability of successful handovers. The present invention is also related to a mobile radio system being configured so as to perform the method of the invention. Furthermore, the invention is related to a network and an user equipment being comprised in the mobile radio system according to the invention.

BACKGROUND

Supporting mobility of users is a basic and very important feature of mobile radio systems [3-5]. Users of such a system expect that the connectivity is maintained when moving from the coverage area of one base station into the coverage area of a second base station.

Modern mobile radio systems such as LTE are based on a frequency reuse factor of one, meaning that each base station uses the whole frequency band. Although it provides high spectral efficiency, the reuse-one deployment will potentially cause significant inter-cell interference (ICI), especially on cell borders. To guarantee a very high handover success-rate becomes challenging, as the successful handover procedure requires good radio link quality to convey necessary control signalling messages between the mobile and the serving/target base stations. At the initial stage of a handover process, the mobile station should be able to receive the Handover-Command from the serving base station in order to execute the handover. During this stage, the target base station often acts as the strongest interferer, causing significant ICI. This can prevent the successful transmission of any signalling message, and in the worst case lead to drop of the connection of the mobile station to the serving base station (resulting in the so-called handover failure). At the succeeding handover stage after the handover has been executed, the mobile station is synchronizing to the target base station by exchanging control signalling with the target. The poor radio link in the target cell induced by ICI can also make the handover a failure.

Normal Inter-Cell Interference Coordination (ICIC) in LTE Release 8/9, e.g. Fractional Frequency Reuse, Soft Frequency Reuse, can be used to mitigate interference in order to support handover. However, it does not improve the performance of the control channels which are especially important for a reliable communication between mobile and base station.

Heterogeneous network (HetNet) deployment of Long Term Evolution (LTE)-Advanced has recently attracted lots of research activities [1, 2]. The main idea of HetNets is to overlay low-power and low-cost base-station (BS, called eNB in LTE) with the conventional macro cellular networks. By deploying such low-power low-complexity eNBs on indoor coverage holes or cell edges, coverage extension can be achieved in a cost-effective way. They can also be deployed on traffic-demanding hotspots to boost local capacity by frequency reuse [2].

Among the low-power eNBs in a HetNet, pico BSs are powerful equipments with the only difference of having lower transmit power than traditional macro cells. They are typically deployed by operators and operated in an open-access mode [1]. However, the promising benefits brought by the macro-pico deployment come along with the new challenges for system design, one of which is in the handover (HO) process.

In conventional homogeneous network, the HO boundary coincides with the cell border induced by the downlink (DL) transmit power of BSs. In a HetNet, however, this HO boundary will lead to the case where the macro BSs become resource constrained while the pico BSs serve very few users, due to the much stronger transmit power of macro BSs. Hence, the HO decision should be made jointly considering the load balance, user mobility and the signal strength [6]. Recently, range expansion (RE) techniques have been considered in 3GPP to offload macro UEs to pico cells by adding a positive bias to the DL signal strength of pico BSs during the cell selection [8, 9]. However, the pico UEs in the expanded-range potentially suffer from the degraded signal-to-interference-plus-noise radio (SINR) in the DL since they are not connected to cells that provide the highest signal strength.

In order to address the more complicated interference scenarios in heterogeneous networks (HetNets), enhanced ICIC (eICIC) techniques have recently been developed for Release 10, which can be classified into the following three categories according to [19]:

Time-domain techniques
Frequency-domain techniques
Power control techniques

By using these techniques, the interference in the control channel can be alleviated. For example, in the time-domain eICIC approaches, the macro nodes are periodically muted at certain subframes to configure so-called Multicast-Broadcast Single Frequency Network (MBSFN) subframes or Almost Blank Subframes (ABS), which will be called "protected subframes" in the following. In those subframes, there is no data transmission in the macro cells. The control channel transmission is also absent or light-loaded. Then the victim pico UE (which is often in the expanded range) can be scheduled in subframes corresponding to protected subframes of the macro nodes, which significantly mitigates the interference of macro to pico. However, in order for the victim pico UE to enjoy a macro-interference-free environment, all the macro nodes in the network should configure the same patterns of protected subframe, and the network synchronization should be perfect. In the following, this eICIC method will be referred to as "Static-ICIC". As will be shown later, this Static-ICIC has only limited ability to improve the handover performance, because only the pico UEs are protected against the interference coming from macro cells during a handover. When the macro UE wants to handover to the neighboring cell or the pico UE performs handover to the neighboring pico cell, this Static-ICIC will not help to reduce the interference.

The ABS can be configured not only at the macro nodes, but also at the pico nodes. In [7], the authors proposed a Mobility-Based-ICIC to enhance the handover performance. Basically, the Mobility-Based-ICIC is a static approach and it is targeted at reducing the failure rate for macro-to-pico handovers for high-speed UEs. For this approach, both pico and macro nodes reserve certain static pattern of protected subframes, and it depends on both the handover types and the UE mobility state (e.g., low-mobility or high-mobility) to utilize the protected subframes. If the handover occurs from pico to macro, the pico nodes can schedule the UE in the protected subframes of macro nodes, just as the previous-mentioned Static-ICIC. On the other hand, if the handover occurs from macro to pico, the macro node can schedule their high-mobility (>=60 km/h) in the protected subframes of pico nodes without co-channel interference from pico nodes. Since low-mobility macro UEs are less vulnerable to handover failures, they will be scheduled in the normal subframes. As can be seen from the above description, the Mobility-Based-ICIC has the potential to improve the inter-layer (macro-pico, pico-macro) handovers, but lacks the ability to handle the intra-layer (macro-macro, pico-pico) handovers, because there is no intra-layer interference coordination mechanism for this method. Besides, the detection of the UE mobility requires additional computational resources and complexity.

SUMMARY

In an embodiment, the present invention provides a handover method. The method includes the steps of: (1a) detecting, at a serving node, signal quality of a signal transmitted from the serving node to a user equipment (UE) being worse than a predefined threshold; (1b) identifying, at the serving node, node(s) transmitting to the UE the strongest signals interfering with signals being transmitted to the UE by the serving node; (1c) sending, by the serving node, a request for starting an inter-cell interference coordination scheme to the node(s) identified in step (1b); (1d) rescheduling, by the node(s) identified in step (1b), users currently being served by the node(s) identified in step (1b) so as to reserve a part of resources according to the inter-cell interference coordination scheme such that the interference, including the control channel interference, is mitigated; (1e) informing, by the node(s) identified in step (1b), the serving node of the UE which resources have been reserved in step (1d); (1f) scheduling, by the serving node, the UE to the resources reserved in step (1d); (1g) starting, by the serving node, handover of the UE from the serving node to a target node; and (1h) completing the handover of the UE. Step (1h) comprises the steps of: (1h1) reserving, at the serving node, the resources identified in step (1d) such that the interference, including the control channel interference, from the serving node to the UE is mitigated; (1h2) synchronizing the UE to the target node; (1h3) scheduling, by the target node, the UE to the resources reserved in step (1d); and (1h4) releasing, after completing the handover in accordance to step (1h), the resources reserved in step (1d), by the node having acted as serving node during the preceding steps; and/or (1h5) releasing, after completing the handover in accordance to step (1h), the resources reserved in step (1d), by the interfering nodes not involved in the handover process.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 9: HO simulation results for Static-ICIC (split into FIGS. 9A-9F).
FIG. 10: HO simulation results for Dynamic-ICIC (split into FIGS. 10A-10F).

DETAILED DESCRIPTION

Figure 1:
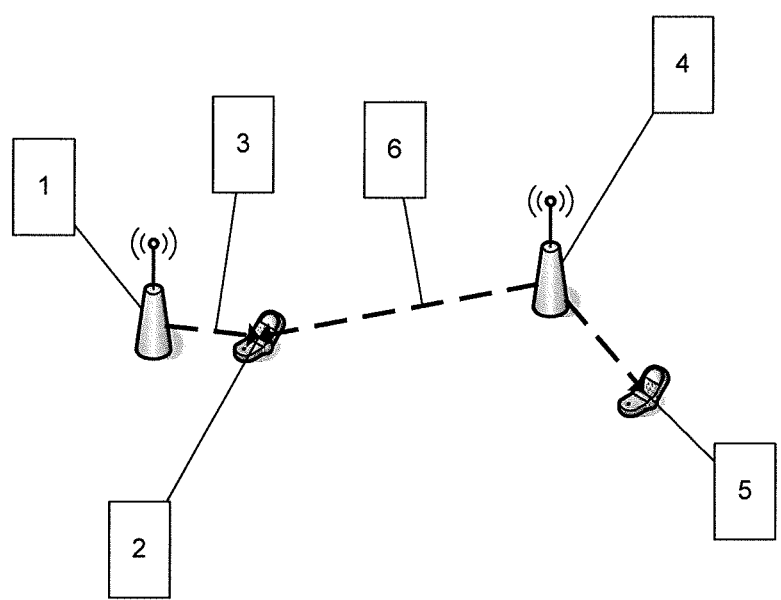
FIGS. 1-5: Network during various stages of the method according to the invention.

In order to facilitate comprehension of the present invention as described later, a few more details as to the state-of-art regarding "handover process", "range expansion", and "Static-ICIC" shall be given now.

Handover Process

The HO process in LTE is briefly described in FIG. 6, where it is divided into 3 stages for the purpose of modeling, which will be described later. Usually, the downlink (DL) Reference Signal Received Power (RSRP) [15] is used in the HO process. A UE keeps monitoring the RSRP from its serving cell and neighboring cells, and processes the measurements using L1 and L3 filters to average out the fast fading. The UE goes from stage 1 to stage 2 once the RSRP from any neighboring cell is larger than that from the serving cell plus a hysteresis margin (the A3 entering condition [16]), i.e., $$P_t^{(dBm)} > P_s^{(dBm)} + \alpha^{(dB)}, \quad (1)$$

where $P_t^{(dBm)}$ and $P_s^{(dBm)}$ denote the filtered RSRP in dBm from the neighboring cell and the serving cell, respectively, and $\alpha^{(dB)}$ denotes the hysteresis in dB. In stage 2, the UE triggers the measurement reporting only if the A3 condition holds throughout the time-to-trigger (TTT) duration, in order to avoid the unnecessary HOs. When the UE successfully receives HO command from the serving cell, it goes to stage 3 and starts the HO execution process. It performs synchronization and accesses the target cell via Random Access Channel (RACH). The target eNodeB replies DL RACH response message indicating the resource allocation and timing advance. Then the UE sends HO complete message to indicate that the HO process is completed for the UE.

Range Expansion

Because of the much lower transmit power of pico eNodeB than that of the macro, the HO triggering condition of Eq. (1) will potentially result in few UEs associated with the pico cells, making the spectrum resources of pico largely wasted. As an effective way to balance the load in the network, range expansion (RE) is being discussed both in industry and academia [8, 9]. With RE, the HO boundary will be shifted toward the macro layer by UEs adding the positive bias value to the received RSRP from the pico cells. Thus, the A3 entering condition becomes $$P_t^{(dBm)} + \beta_t^{(dB)} > P_s^{(dBm)} + \beta_s^{(dB)} + \alpha^{(dB)}, \quad (2)$$

where $P_t^{(dBm)}$, $P_s^{(dBm)}$ and $\alpha^{(dB)}$ have the same meanings as in Eq. (1), and $$\begin{cases} \beta_{t(s)}^{(dB)} = 0, & \text{if target (source) is a macro cell} \\ \beta_{t(s)}^{(dB)} > 0, & \text{if target (source) is a } pico \text{ cell.} \end{cases}$$

In this way, more UEs are actively pushed to the pico layer although it is not providing the strongest DL signal strength. Thus, those UEs in the expanded range may suffer from severe interference from macro layer and hence it will limit the gains of cell splitting. To fully realize the potential benefits of the RE, appropriate ICIC mechanisms should be adopted.

Static-ICIC

The idea is that the macro cells refrain from using some resources such that pico node can schedule UEs in the expanded range on those resources to avoid the interference from macro cells. The coordinated resources could be the subframes in time domain or the sub-bands in frequency domain. For example, in static time-domain ICIC techniques, the macro nodes are periodically muted at certain subframes (almost blank subframes (ABSs); reference signals are still transmitted in the ABSs which may still cause some interference problems. However, UEs can have the ability to cancel the interference by estimating it from neighboring cells and subtracting it from the received signal [1]. Thus, the impact is neglected here). The ABS muting pattern is static and all the macro cells in a given local area in coordination are using the same pattern. If perfect time synchronization is assumed in the network, pico UEs will enjoy a macro interference-free expanded range.

For the Static-ICIC introduced above, only the pico UEs are protected against the interference coming from macro cells during HOs. As will be shown in the simulation (cf. below), the failure rate of pico-macro HOs decreases due to the improved radio link quality. However, if the macro UE wants to HO to the neighboring cell or the pico UE performs HO to the neighboring pico cell, this Static-ICIC will probably not help.

In summary, the current approaches are not effective in dealing with the complex interference scenarios during the handover process in mobile networks, especially, but explicitly not limited to, in HetNets, which negatively affects the handover performance.

Consequently, there is a need to improve the quality of handover processes in mobile networks, especially in HetNets, in comparison with the above described state-of-art, in particular with regard to the described problems caused by interference. Moreover, there is a need to overcome the above described disadvantages of Static-ICIC methods and corresponding systems therefore.

Thus, embodiments of the present invention provide a method and a system allowing for an improved quality of handover processes in mobile networks, especially in HetNets. Embodiments of the present invention further provide a method and a system allowing to overcome and/or to circumvent the disadvantages of Static-ICIC.

The present invention is related to an interference coordination method to aid the handover process. It aims at improving the signal quality (for example, the SINR) of the radio link to increase the probability of successful handovers. It operates between the serving node and one or several of the neighboring nodes that is/are producing the strongest co-channel interference. The method can, e.g., be implemented in, but is not limited to, LTE/LTE-A mobile networks. The identification of the strongest interfering node can be done by the UE via measuring the RSRP from neighboring cells. In most the cases, the strongest interferer is also the target cell for the handover. Nevertheless, for the inventive method to work, it is not necessarily so.

Throughout the remainder of this document, the term "signal quality" shall correspond to a real number for measuring the quality of a signal. In other words, the "signal quality" corresponds to a measured quality of the signal in a suitable scale. For example, the signal quality can be measured in terms of the signal-to-interference-plus-noise-ratio (SINR). Then, the quality of signal is the better, the larger the SINR value is. However, other measurement schemes and/or measurement methods can be used as well.

Then, if the quality of the signal is measured, wherein the value is the larger, the better the measured quality is, then expressions like "signal quality being/is better (worse) than a predefined threshold" denote that the value corresponding to the signal quality is larger (smaller) than the predefined threshold. For example, this is the case, when the quality of the signal is measured using the signal-to-interference-plus-noise-ratio (SINR).

On the other hand, if the quality of the signal is measured, wherein the value is the smaller, the better the measured quality is, then expressions like "signal quality being/is better (worse) than a predefined threshold" denote that the value corresponding to the signal quality is smaller (larger) than the predefined threshold. For example, this is the case, when the quality of the signal would be measured using the reciprocal of the signal-to-interference-plus-noise-ratio (SINR).

Furthermore, expressions like "the strongest interference signals" or "the strongest signals interfering . . . " shall refer to a group of signals, the signals of which are fulfilling a suitable condition related to the power of a signal. For example, it can be required that the power of the each of the signals may be stronger than a predefined threshold. Then, the power of each of the strongest interference signals is stronger than this predefined threshold. Or alternatively, when a set of n (with n>1) signals is detectable (measurable), the condition can be that the strongest interference signals consist of only the m (with m<n) strongest signals. Then, if m=1, the (group of) strongest interference signals consist only of the one interference signal having the strongest power. However, in the case that only one interference signal is detectable (measurable), then the expression "the strongest interference signals" refers only to this single interference signal.

Moreover, the term "neighbouring nodes" denote a group of nodes being neighboured to a certain reference node (usually the serving node), wherein the reference node itself is not comprised in the (group of) "neighbouring nodes", and wherein "neighboured" can be defined according to any one of the following definitions: (i) All nodes, the signal of which is detectable at a certain measuring position. (ii) All nodes, the signal power of which is stronger than a predefined threshold at a certain measurement position. (iii) If the signals of n' nodes are detectable at a measuring position: the m' nodes (with m'<n') transmitting the signals having the strongest signal power at the measuring position. (iv) If the signals of n' nodes are detectable at a measuring position: the m' nodes (with m'<n') transmitting the signals causing the strongest interference with the signal of the reference node at the measuring position. (v) All nodes within a certain radius around the reference node. (vi) The node(s) having the smallest distance to the reference node. In the definitions (i) to (iv), the term "measuring position" can be, e.g., the position of the reference node or the position of a UE connected to the reference node. Of course, any other definition suitable in this context may be chosen.

The invention provides a method for improvement of handover quality in mobile radio systems, the method comprising the steps of:
(1a) detecting, at the serving node, the signal quality of the signal transmitted from the serving node to a UE, being worse than a predefined threshold;
(1b) identifying, at the serving node, the node(s) transmitting to the UE the strongest signals interfering with the signals being transmitted to the UE by the serving node;
(1c) sending, by the serving node, a request for starting an inter-cell interference coordination scheme to the node(s) identified in step (1b) as transmitting the strongest interference signals;
(1d) rescheduling, by the nodes identified in step (1b), the users currently being served by the nodes identified in step (1b) so as to reserve a part of the resources according to the inter-cell interference coordination scheme such that the interference, including the control channel interference, is mitigated;
(1e) informing, by the nodes identified in step (1b), the serving node of the UE, which resources have been reserved in step (1d);
(1f) scheduling, by the serving node, the UE to the resources reserved in step (1d);
(1g) starting, by the serving node, the handover of the UE from the serving node to a target node;
(1h) completing the handover of the UE.

According to a preferred embodiment of the method, before executing the steps (1a) to (1g), the following steps are performed:
(2a) detecting, by the user equipment (UE), the signal quality of the signal transmitted from the serving node, the signal quality considering the degree of interference of the signal transmitted by the serving node with signal(s) transmitted by neighboured nodes;
(2b) repeating step (2a) as long as the detected signal quality is better than a predefined threshold;
(2c) identifying, by the UE, the node(s) transmitting to the UE the strongest signals interfering with the signals being transmitted to the UE by the serving node;
(2d) sending, by the UE, a message to the serving node, the message comprising information about the signal quality being worse than a predefined threshold and the node(s) being identified in step (2c) as transmitting the strongest interference signals;
(2e) receiving, at the serving node, the message sent by the UE in step (2d); and
wherein both, step (1a) of detecting the signal quality and step (1b) of identifying node(s) sending interfering signals, comprise the step of:
(2f) evaluating, at the serving node, the message received according to step (2e).

Step (1h) of completing the handover of the UE may comprise the steps of:
(3a) reserving, at the serving node, the resources identified in step (1d) such that the interference, including the control channel interference, from the serving node to the UE is mitigated;
(3b) synchronizing the UE to the target node;
(3c) scheduling, by the target node, the UE to the resources reserved in step (1d);
(3d) releasing, after completing the handover in accordance to step (1h), the resources reserved in step (1d), by the node having acted as serving node during the steps of (1a) to (1g); and/or optionally comprising the further step of:
(3e) releasing, after completing the handover in accordance to step (1h), the resources reserved in step (1d), by the interfering nodes not involved in the handover process.

Preferably the target node is one of the node(s) identified in step (2c) as transmitting the strongest interference signals.

In case the target cell is one of the identified interferers, the use of this embodiment of the method has the following advantages:
1) The target node automatically releases the resources reserved in the target node. Otherwise, an additional procedure would be needed to release the resources in target node (see the following description of an alternative embodiment).
2) More importantly, this embodiment of the method guarantees the good radio quality in the target node because the reserved resources in the target node corresponds to exactly the same resources having allocated to this UE in the serving cell that are now becoming blank. These reserved resources also overlaps with the same muted resources in other interfering nodes (if more than one interfering nodes are in coordination). Thus, there is no interference by signals transmitted from the serving cell and other strongest interfering nodes, ensuring the necessary signalling between target cell and UE in the rest of the HO process.

Alternatively, step (1h) of completing the handover of the UE may comprise the steps of:
(4a) synchronizing the UE to the target node;
(4b) releasing the resources reserved in step (1d), by the target node and/or comprising the further step of:
(4c) optionally, releasing the resources reserved in step (1d), by the interfering nodes not involved in the handover process;
(4d) identifying, at the target node, the node(s) transmitting to the UE the strongest signals interfering with the signals being transmitted to the UE by the target node;
(4e) sending, by the target node, a request for starting an inter-cell interference coordination scheme to the node(s) identified in step (4d) as transmitting the strongest interference signals;
(4f) rescheduling, by the nodes identified in step (4d), the users currently being served by the nodes identified in step (4d) so as to reserve a part of the resources according to the inter-cell interference coordination scheme such that the interference, including the control channel interference, is mitigated;
(4g) informing, by the nodes identified in step (4d), the target node of the UE, which resources have been reserved in step (4d);
(4h) scheduling, by the target node, the UE to the resources reserved in step (4f);
(4i) releasing, after completing the handover in accordance to step (1h), the resources reserved in step (4f) in the node(s) identified in step (4d).

The signal quality is the signal-to-interference-plus-noise ratio (SINR).

Step (2c) of identifying, by the UE, the node(s) transmitting to the UE the strongest signals may comprise a step of:
(5a) measuring the reference signal received power (RSRP) from the neighbouring nodes.

Step (1c) of sending a request may be performed via a direct interface between two transmitting nodes, for example, an X2 interface in case of LTE. The serving node may be an eNodeB.

The inter-cell interference coordination scheme may be a time-domain technique, a frequency-domain technique or a power-control technique.

The inter-cell interference coordination scheme preferably mitigates the interference in the control channel comprising periodically muting the node(s) identified in step (1b) at certain subframes in accordance to a muting pattern, wherein preferably the muted subframes are Almost Blank Subframes (ABS) or MBSFN Subframes.

The handover (HO) can be an intra-layer HO, for example a HO from a macro node to a macro node or from a pico node to a pico node, or an inter-layer HO, for example a HO from a macro node to a pico node or a HO from a pico node to a macro node.

The invention also provides a network allowing for improved handover quality, the network comprising a plurality of nodes, wherein each of the nodes is configured for:
  sending, after receiving the message from the UE, a request for starting an inter-cell interference coordination scheme to the interfering node(s) indicated in the message;
  receiving information from the interfering node(s) as to the resources being reserved in accordance to the inter-cell interference coordination scheme;
  scheduling the UE to the resources reserved in accordance to the inter-cell interference coordination scheme;
  starting the handover of the UE from the serving node to a target node;
and wherein each of the nodes is further configured for:
  rescheduling, after receiving from another node a request for starting an inter-cell interference coordination scheme, the users currently being served by the node so as to reserve a part of the resources in accordance to the inter-cell interference coordination scheme;
  informing the other node, which resources have been reserved in accordance to the inter-cell interference coordination scheme.

Preferably, each of the nodes is further configured for:
  receiving, from a user equipment (UE) being served by the node, a message, the message comprising:
    information about the signal quality of the signal transmitted from the node to the UE being worse than a predefined threshold and
    indication of the interfering node(s) identified by the UE as
    transmitting the strongest signals interfering with the signal transmitted by the node serving the UE.

The invention also provides user equipment (UE), configured for:
  permanently or repeatedly detecting the signal quality of the signal transmitted from a node serving the UE, the signal quality considering the degree of interference of the signal transmitted from the node serving the with signal(s) transmitted by other nodes;
  identifying the node(s) transmitting to the UE the strongest signals interfering with the signals being transmitted to the UE by the node serving the UE;
  sending, upon detecting a signal quality being worse than a predefined threshold, a message to the node serving UE, the message comprising information about the signal quality being worse than a predefined threshold and the node(s) being identified as transmitting the strongest signals interfering with the signals transmitted by the node serving the UE.

The invention also provides a mobile radio system, comprising the network according to the invention and one or more user equipment(s) according to the invention. The mobile radio system may be further configured to perform the method according to the invention.

Advantages of the Invention

The method according to the invention has, inter alia, the following advantages and advantageous features compared to existing solutions:
Executed between any two serving and neighboring nodes:
  The interference coordination is performed between the serving node and the strongest interfering node, which can be macro-macro, macro-pico, pico-macro, pico-pico base stations. In most of the cases, the strongest interferer is also the target cell for the handover. Nevertheless, for the inventive method to work, it is not necessarily so. The inventive method can also be generalized to involving the serving and several interfering nodes. The negotiation of the protected subframes among those nodes will be slightly complicated than that in the case where only two nodes are involved. However, as verified by simulation (see below), by the simplest coordination between only the serving and the strongest interfering nodes, the handover performance has already been significantly improved (cf. the simulation results given below).
On-demand usage of protected subframes:
  The interference coordination is based on dynamic interaction. The strongest interfering node starts the protected subframe transmission only when it receives a request from its neighboring node, where its UE detects that the current signal quality (e.g., the SINR) drops below a certain threshold. Otherwise, all nodes will use normal subframes to transmit. Compared to the Static-ICIC techniques, the on-demand ICIC as provided by the invention utilizes the resources more efficiently. Furthermore, there is no network synchronization required.
Improvement in the performance of control channels:
  By using protected subframes, also the interference for control channels is reduced. This increases the performance (especially the reliability) of the control channels, which is highly important for a successful handover.
Light signalling overhead:
  The coordination only involves two nodes, serving node and strongest interfering node (or, in the generalised case of several interfering nodes, the serving node and only the strongest interfering nodes are involved). Additionally the amount of data that has to be exchanged between these nodes rather low. For these reasons the signalling overhead incurred is quite light.
Very effective in improving the handover performance:
  It have been compared the handover performance of the inventive method and the existing methods by simulation (see below). The measured RSRP values from a field trial activity have been used as the input to the handover model for the handover simulation in order to guaranty a realistic simulation environment.
  Simulation results are given in the following sections. As will be shown, the method of the invention reduces the handover failure rate significantly.

Other aspects, features, and advantages will be apparent from the summary above, as well as from the description that follows, including the figures and the claims.

In the following, an embodiment according to the method of the invention shall be described with regard to the FIGS. 1 to 5. In order to simplify the description of the method according to this embodiment, it is assumed that the target node of the handover is exactly the strongest interferer.

Referring now to FIG. 1, a user equipment, for example a mobile station (MS) 2, is moving from the serving base station (BS) 1 towards a target BS 4, while the target BS 4 is serving its own user MS 5 using the same time-frequency resources, thus producing strong co-channel interference 6 to the moving MS 2.

Figure 2:
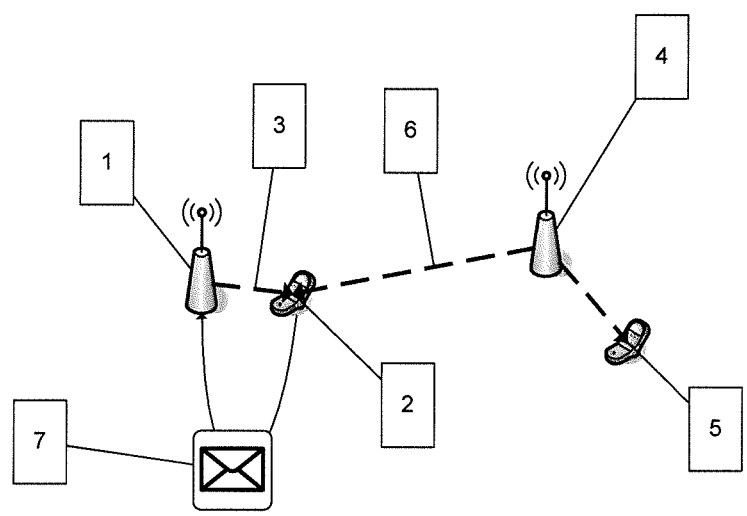

Once the moving MS 2 detects that its signal quality (e.g., the SINR) drops below a certain threshold, it will inform its serving BS 1 by a measurement report 7 as shown in FIG. 2. At the same time, the moving MS 2 also reports the identified strongest interfering BS (handover target BS). The measurement and reporting mechanisms used for this purpose are well known state-of-art mechanisms, which are e.g. part of the LTE standard.

Figure 3:
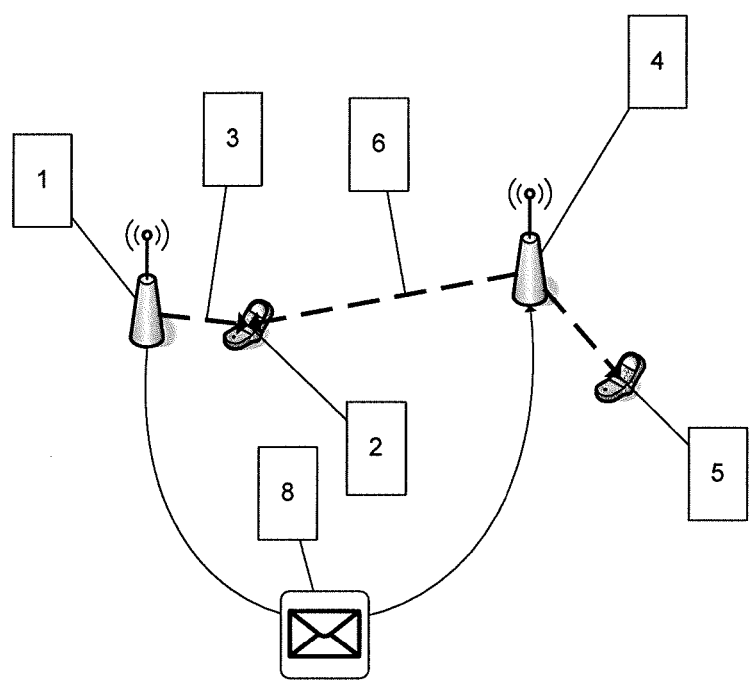

The next step is depicted in FIG. 3, where the serving BS sends a request 8 to the interfering BS for protected subframes. In LTE, this communication can be done via X2 interface.

After the strongest interfering BS 4 receives the request, it will reschedule its current user in order to reserve some resources, e.g. ABS subframes in LTE. Then it informs the serving BS 1 which resources have been blanked, e.g. the ABS pattern in LTE. In this way, the serving BS 1 can schedule the moving MS 2 to the resources that are protected from the strongest interferer.

Figure 4:
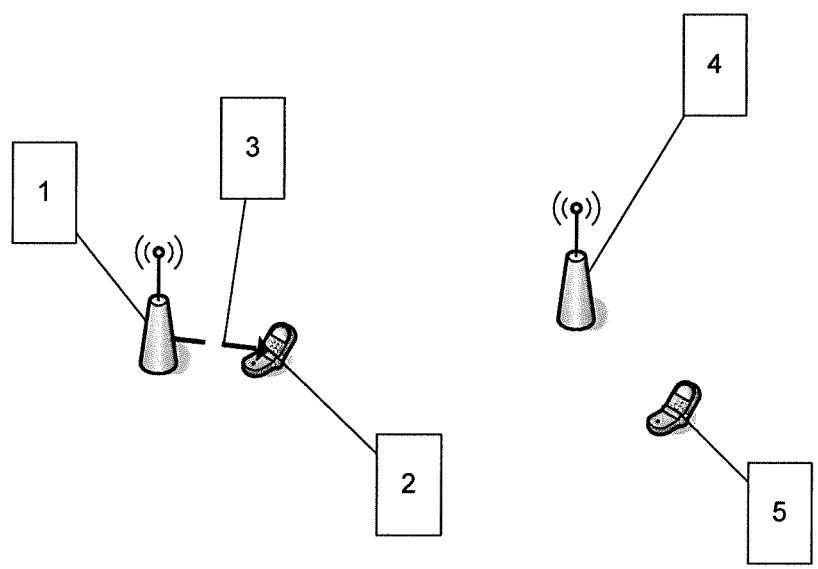

During the protected subframes, the interfering BS 4 does not transmit data (or only a very low amount) as depicted in FIG. 4. So, the signal quality (e.g., the SINR) in the serving link 3 has been improved. The improved signal quality ensures a good chance for a successful handover. During the protected subframes, the MS 5 connected to the interfering BS does not receive data from the interfering BS 4. This does not lead to a problem as the interfering BS 4 can prepare this situation in advance and send data for MS 5 connected to the interfering BS before or after the protected subframe.

Figure 5:
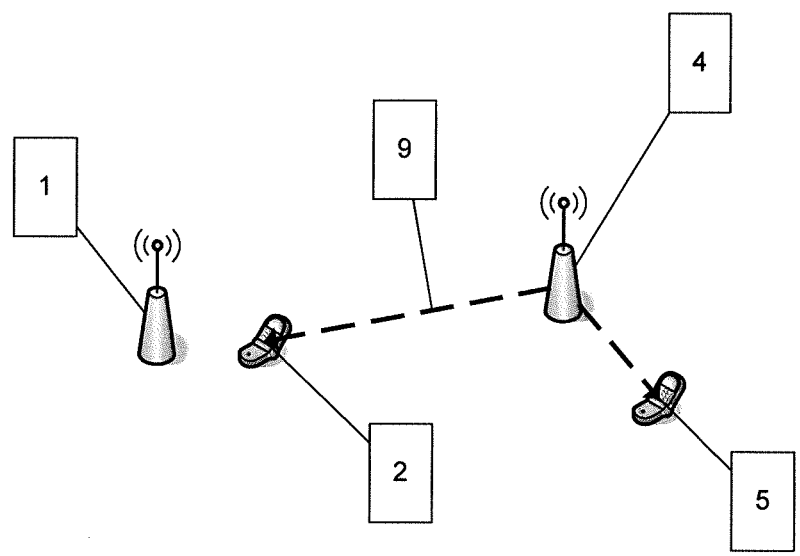

FIG. 5 shows that after the moving MS 2 has successfully received the necessary commands to detach from the serving node and is trying to synchronize to the target BS 4, the target BS 4 can schedule the moving MS 2 to the reserved resources. Hence, the previously protected subframes in the target cell are now filled. Because the corresponding resources in the previous serving BS 1 now become blank, meaning that no interference from the serving to target at this handover stage, the resulting high signal quality (e.g., the SINR) in the target cell 9 now guarantees any necessary signalling message in the rest of the handover process. After the whole process of handover is completed, the original serving BS 1 will then release the related resources associated to this moving MS 2.

In the following, an embodiment of the "Dynamic-ICIC" as used in the method of the present invention will be described. The Dynamic-ICIC described in the following allows for improving the radio link quality during HOs of any type.

The Dynamic-ICIC is not limited in the pico expanded range. Instead, it can be performed between any two serving and neighboring cells. As long as UE detects that the current signal quality (e.g., the SINR) drops below a certain threshold and identifies the strongest interferer (e.g., by measuring the RSRP) from neighboring cells, the serving node (e.g., an eNodeB when using LTE) will request the transmission of reserved resources (e.g. ABS) from the strongest neighboring cell. The neighboring node informs the planned pattern of reserved resources to the serving node (e.g., via X2 interface) and begins transmission of the reserved resources in the following frames. Hence, the victim UE can be scheduled by the serving node on the resources (e.g. subframes) protected from the strongest interferer. In the meanwhile, the UE keeps monitoring the signal quality of the non reserved resources (e.g. subframes corresponding to the non-ABS) at the neighboring cell. When the signal quality over the non-reserved resources (e.g. non-ABS) becomes improved, the serving cell will notify the neighboring cell to stop transmission of the reserved resources (e.g. ABS transmission). Compared to the Static-ICIC, the Dynamic-ICIC utilizes the resources more efficiently. Also note that the interference coordination only occurs between the serving cell and the strongest interfering cell (or the strongest group of interfering cells). Hence the signalling overhead incurred is quite light.

Figure 7:
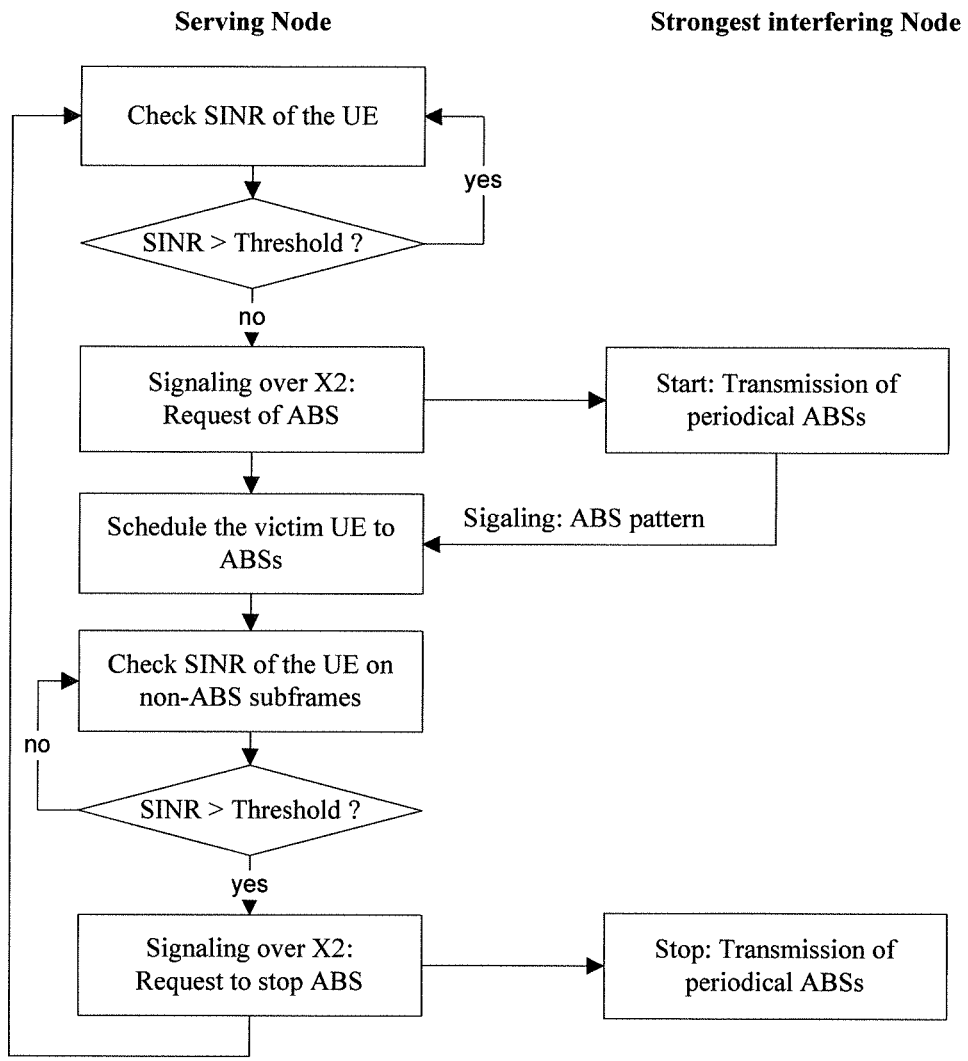
FIG. 7: Dynamic-ICIC.

An embodiment of the disclosed Dynamic-ICIC in a implementation suitable for LTE is presented in the flow chart of FIG. 7.

Simulations

In order to estimate the efficiency of the method and the system according to the present invention, simulations have been performed that will be described and discussed in the following.

In the simulation, a novel measurement-based approach has been adopted, where the real measured data of the reference signal received power (RSRP) in a macro-pico deployment are collected. Then the mobility performance in terms of the HO failure rate and ping-pong rate is simulated with various ICIC schemes in the same reality environment. This has been made possible by modeling the possible HO failure events based on evaluating the downlink received signal-to-interference-plus-noise ratio (SINR) from RSRP. The simulation results indicate that RE together with ICIC can have positive or negative influences on macro-pico, pico-macro, pico-pico and macro-macro HOs in a HetNet. The existing Static-ICIC or Mobility-Based-ICIC cannot handle the intra-layer (pico-pico and macro-macro) interference, thus limiting their abilities to improve the mobility performance. In contrast, it will be shown that the Dynamic-ICIC according to the invention as disclosed above is more flexible and effective in mitigating both the inter-layer and intra-lay interference, outperforming the existing methods significantly.

Handover Failure Modeling

The basic idea is to use the DL SINR as a universal metric to model the possible handover failure events. The DL SINR of the i-th cell can be estimated as $$SINR_i = \frac{RSRP_i}{\sum_{j \in C, j \neq i} RSRP_j + N_0 \Delta f}, \quad (3)$$

where C is the set of cells detectable by the UE, $N_0$ is the white noise power spectral density, $\Delta f$ is the subcarrier bandwidth (15 kHz in LTE). Note that the RSRP is defined as the power per resource element in LTE [15]. Hence the noise bandwidth is chosen accordingly.

Figure 6:
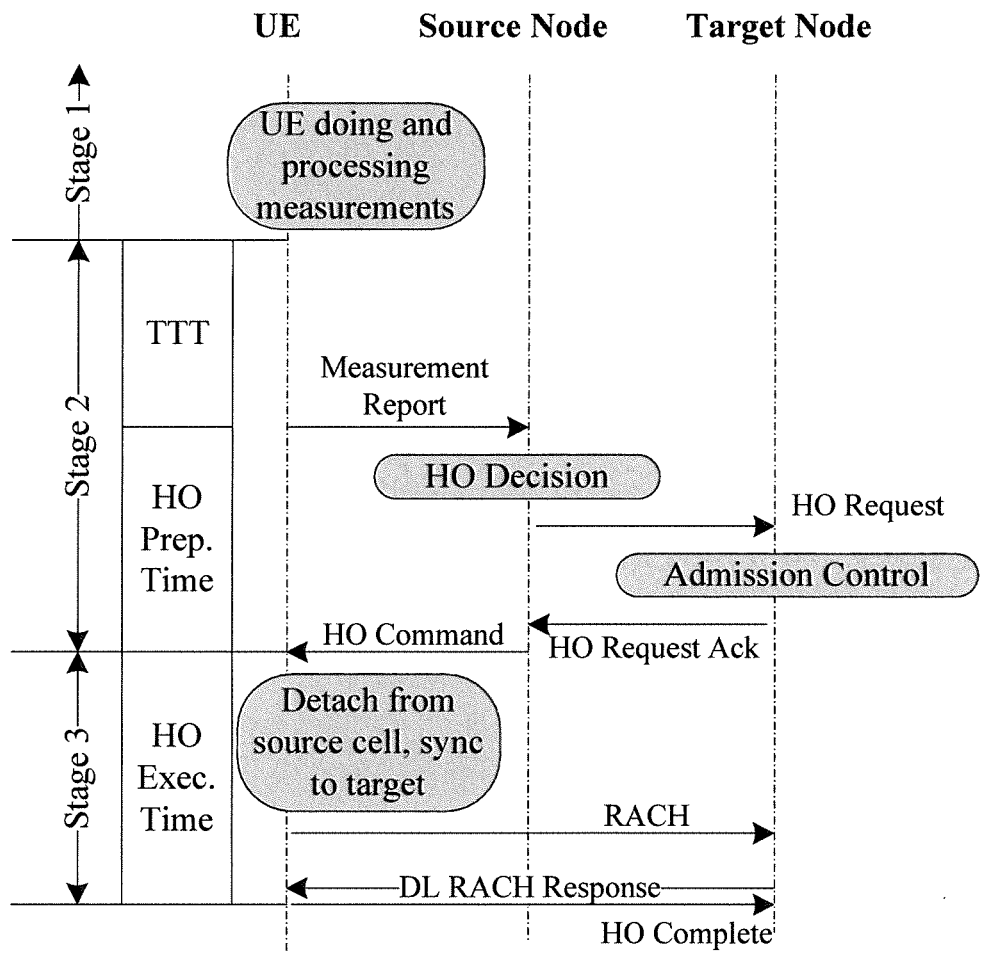
FIG. 6: Handover process.

From FIG. 6, one can see that a successful HO requires good radio link condition of the UE-source in stage 2 and the UE-target in stage 3 to ensure the successful signalling exchange. Thus, the HO failure is modelled due to the following reasons [17]:
1) Radio link failure (RLF);
2) Physical downlink control channel (PDCCH) failure.

In stage 1, if a RLF event is simply due to shadowing or UE out of radio coverage, it should not be labeled as HO failure. RLF events in stage 1 under the conditions that other suitable cell, say cell j, is available (i.e., $SINR_j > -8$ dB [17]) may be accounted as HO failures. When a UE tracks RLFs according to [14], it uses two sliding windows to evaluate the average signal quality values of $Q_{out}$ and $Q_{in}$, respectively. $Q_{out}$ is monitored with a 200 ms window and $Q_{in}$ is evaluated over a 100 ms window [18]. Both windows are updated once per frame (10 ms) with the estimated DL SINR value as given in (2). When $Q_{out}$ is lower than a threshold $Q_{out,th}$ (−8 dB, recommended in [17]), bad radio link condition is considered and the T310 timer is started. During the period when T310 is running, if $Q_{in}$ is larger than a threshold $Q_{in,th}$ (−6 dB, recommended in [17]), meaning that the radio link quality recovers, the UE will stop T310. A RLF will finally be declared when T310 (1 s usually) expires.

In stage 2, all RLF events are counted as HO failures. Besides, even RLF is not declared (but T310 is running), the radio link quality could be really bad to prevent any message exchange. At the end of stage 2, the source cell should be able to deliver HO command successfully to UE via PDCCH. HO could fail due to the PDCCH failure. Thus, the PDCCH failure is modelled as follows: Timer T310 has been triggered and is running when the HO command is sent.

In stage 3, the UE has been detached from the source cell. So it is the signal strength from the target cell that actually matters. RLF will normally not be declared in the target cell in stage 3, because the HO execution time is much shorter than T310. Instead, HO could fail due to PDCCH failure in the target cell. As a result, the UE may not receive the DL RACH response from the target cell after the receiving window is expired; hence, HO failure will occur. To model this, it is checked whether the average SINR from the target cell is less than the threshold $Q_{out,th}$ (−8 dB) at the end of stage 3.

Note that HO failure may be also due to the congestion in the target cell. However, this is not related to the present invention and hence it is not taken into account in the model.

Ping-Pong Modeling

The time-of-stay that a UE stays connected with cell i after a HO is used as the metric to evaluate the ping-pong (PP) behavior. A HO from cell j to cell i then handover back to cell j is defined as a PP if the time-of-stay in cell i is less than a minimum time-of-stay (MTS). The time-of-stay in cell i is the duration from when the UE successfully sends a HO complete message to the cell i, to when the UE successfully sends a HO complete to cell j. In general, if a UE has a time-of-stay less than MTS, the HO may be considered as an unnecessary handover. In the simulation, it is set MTS to 1 s [17].

ICIC Modeling

In the following, two kinds of approaches will be considered, Static- and Dynamic-ICIC and the impacts on the HO performance will be investigated.

Modeling of Static-ICIC

To include Static-ICIC into our HO modeling, the SINR calculation of Eq. (3) is revised as $$\begin{cases} SINR_i = \dfrac{RSRP_i}{\sum_{k \in C_p} RSRP_k + \sum_{j \in C_m, j \neq i} RSRP_j + N_0 \Delta f}, & i \in C_m \end{cases}$$

$$SINR_i = \dfrac{RSRP_i}{\sum_{j \in C_p, j \neq i} RSRP_j + N_0 \Delta f}, \quad i \in C_p,$$

where $C_p$ is the set of detectable pico cells, and $C_m$ is the set of detectable macro cells. One has $C = C_p \cup C_m$.

Modeling of Dynamic-ICIC

To investigate the impact of the inventive Dynamic-ICIC on the HO performance, it is assumed that the strongest interference can always be successfully ruled out. Thus, for the HO modeling purpose, the SINR of the serving cell i in Eq. (3) is revised into $$SINR_i = \dfrac{RSRP_i}{\sum_{j \in C, j \neq i, \bar{k}} RSRP_j + N_0 \Delta f},$$

where $\bar{k} = \arg\max_{k \in C, k \neq i} RSRP_k$, and C is the set of cells detectable by the UE.

Measurement-Based Simulation Methodology

A field test activity was carried out in the city of Darmstadt, Germany, using an experimental LTE cellular system. A vehicle equipped with a scanner moved along the street. An LTE scanning device recorded the received RSRP from different cells every 100 ms roughly, together with the GPS coordinates of the moving trajectory. Then the measured RSRP values are used as the inputs to our HO model for HO simulation. Although the RSRP is only measured at discrete location points, one can obtain the RSRP values at any location along the trajectory by interpolation. During the simulation, a UE is randomly dropped in the field and moving at a constant speed following the path along which the test equipment was moving, but with a random direction. Within the simulation time, it has been kept record of all HO events (success and failure) and the PP events. Since HO failure recovery and cell reselection are not modeled in the 3-stage approach, UE is removed from the simulation if HO failure occurs and a new drop is started.

Simulation Results

Without Range Expansion or ICIC

In this subsection, it will be simulated the HO performance in terms of the HO failure rate and the PP rate without using range expansion or ICIC, as the comparison baseline. The HO failure rate is defined as the number of HO failures divided by the sum of the number of HO failures and successes. The PP rate is defined as the ratio of the number of PP events to the number of successful HOs. The HO and simulation parameters are summarized in Table I and Table II, respectively [17].

TABLE I

HO parameter sets.

| Items | Set1 | Set2 | Set3 | Set4 | Set5 |
|---|---|---|---|---|---|
| TTT (ms) | 480 | 160 | 160 | 80 | 40 |
| Hysteresis α (dB) | 3 | 3 | 2 | 1 | −1 |
| Measurement L3 filter K | 4 | 4 | 1 | 1 | 0 |

TABLE II

Simulation parameters.

| Parameters | Description |
|---|---|
| HO preparation time | 50 ms |
| HO execution time | 40 ms |
| Minimum time-of-stay | 1 s |
| $Q_{out, th}$ ($Q_{in, th}$) | −8 dB (−6 dB) |
| T310 | 1 s |
| UE speed | 3 km/h, 30 km/h, 60 km/h, 120 km/h |
| Thermal noise density $N_0$ | −174 dBm/Hz |

Figure 8A:
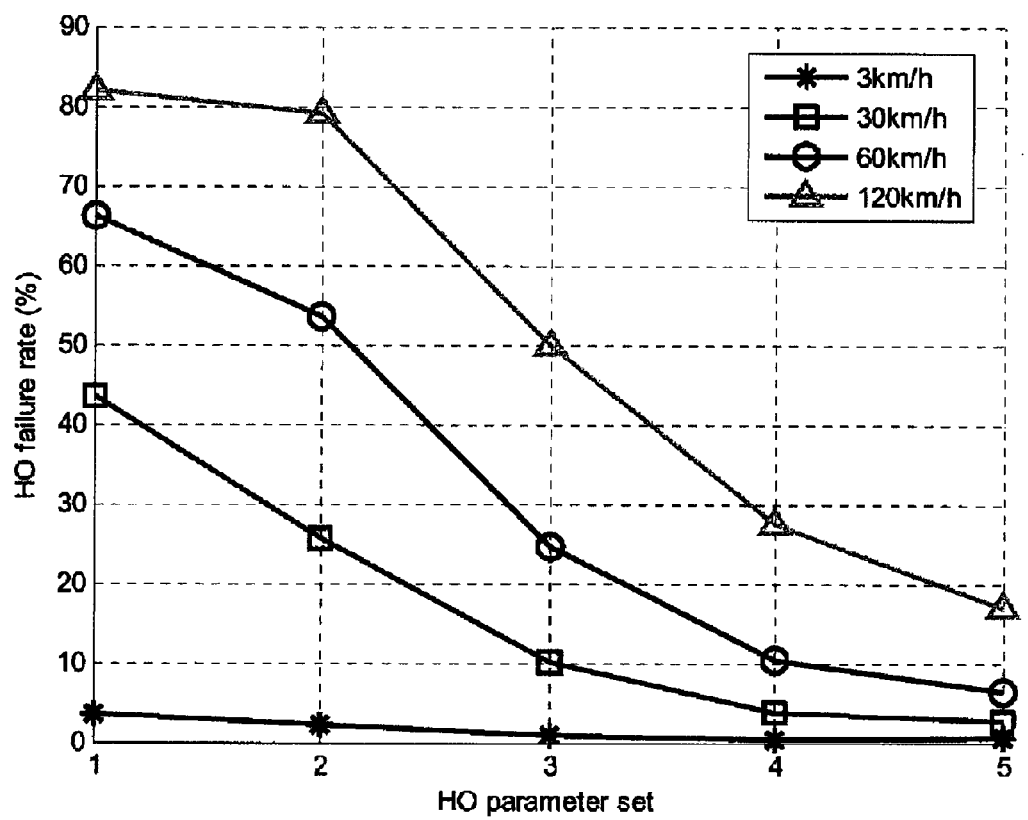
FIG. 8: HO simulation results for no RE or ICIC: (a) HO failure rate, (b) PP rate.
Figure 8B:
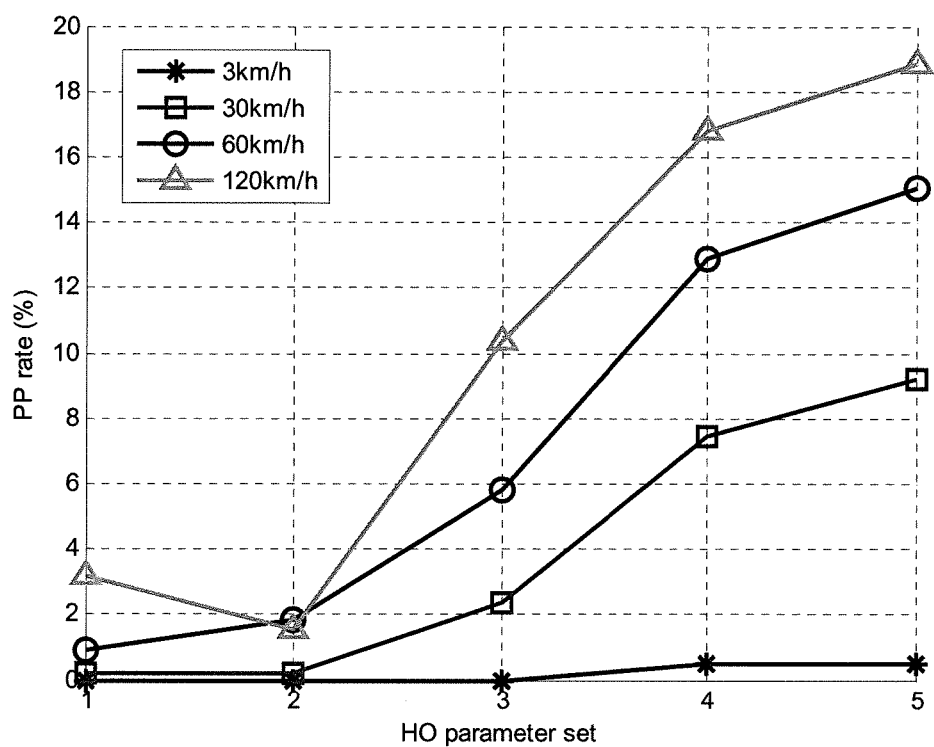

FIG. 8a and FIG. 8b show the simulated HO failure rate and PP rate, respectively. One can observe that the UE speed has a significant influence on the HO performance. Higher speed UE suffers higher HO failure rate and PP rate. Besides, HO parameter sets from 1 to 5 show the tradeoff between HO failure and PP rates. Generally, the lower the HO is, the higher the PP rate will be. Set 3 achieves the balance between HO failure and PP performance, however, the failure rate is still too high for a practical system, especially for high speed UEs. The results given in FIGS. 8a and 8b reveal the unsatisfying HO performance in the field trial area, calling for efficient methods of mobility enhancement.

Range Expansion and Static-ICIC

The impacts of the RE and Static-ICIC on the HO performance are simulated in this subsection and the results are plotted against the RE bias values in FIG. 9, where HO parameter set 3 has been chosen for illustration. All the pico cells adopt the same bias value. FIG. 9A shows the decreased HO failure rate by using Static-ICIC, compared to the baseline system (without RE or ICIC). However, the performance gains decrease gradually as the RE bias increases. This can be explained by separating the results according to all 4 possible HO types, as shown in FIGS. 9B to 9E, where the distinct impacts can be observed. For the pico-macro HO (FIG. 9B), on one hand the SNR of the pico UE is significantly improved due to the absence of the macro interference, but on the other hand the signal strength from the serving pico becomes weaker and weaker as the HO boundary is shifted away from the pico cell by increasing the RE bias value. As a result, the HO failure rate decreases dramatically at the very beginning when the Static-ICIC with zero RE bias is used, but increases gradually as the bias increases. For the macro-pico HO (FIG. 9C), however, the RE bias plays a rather positive role. As shown in FIG. 9C, increasing the bias can almost always reduce the HO failure. This is because by shifting the HO boundary toward the serving cell (macros in this case), one obtains the improved signal quality to ensure the success of the HO stages 1 and 2. In stage 3 when it is taken over by the target pico, the UE will be protected from the macro interference thanks to the Static-ICIC. Hence, the incremental improvement in HO failure rate is observed in FIG. 9C. As for the pico-pico (FIG. 9D) and macro-macro (FIG. 9E) HO cases, there is no significant improvement in the HO failure rate because Static-ICIC does not reduce the interference from the same layer as mentioned in before. Thus, due to the combinational effect of FIG. 9B and FIG. 9C, the overall results shown in FIG. 9A have certain bias values to achieve the minimum HO failure rate. For example, the minimum of 35 percent of HO failure rate is obtained by the bias of 5 dB for the velocity of 120 km/h. However, because the Static-ICIC cannot handle the intra-layer interference effectively, the high failure rates of pico-pico and macro-macro HOs impair the overall performance in FIG. 9A.

Figure 9A:
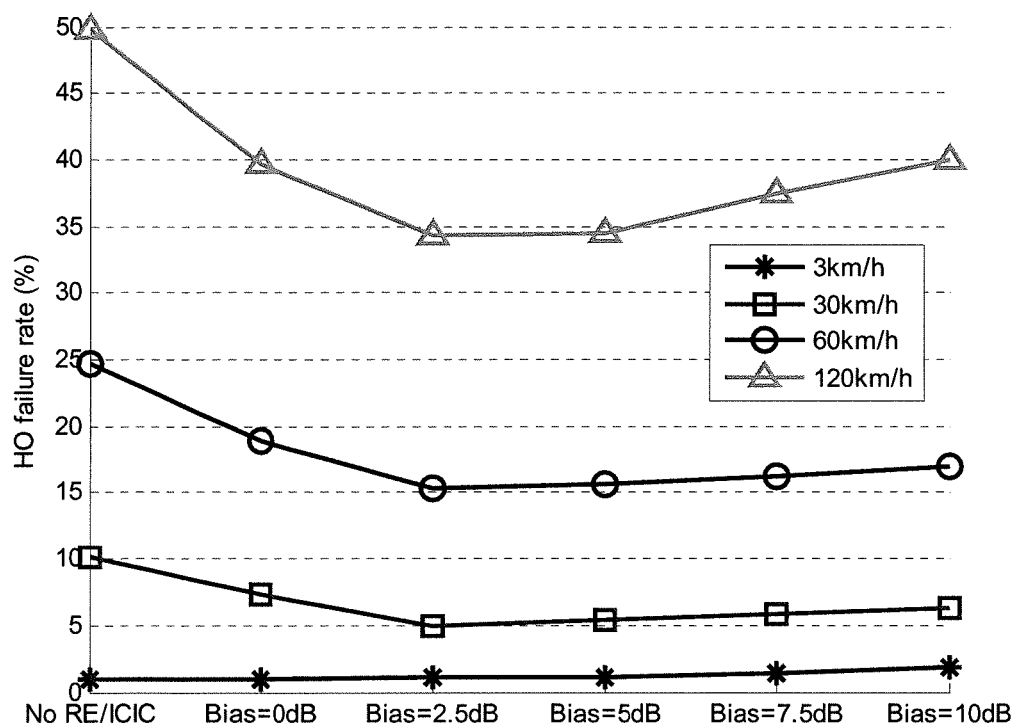
FIG. 9A: Overall HO failure rate.
Figure 9B:
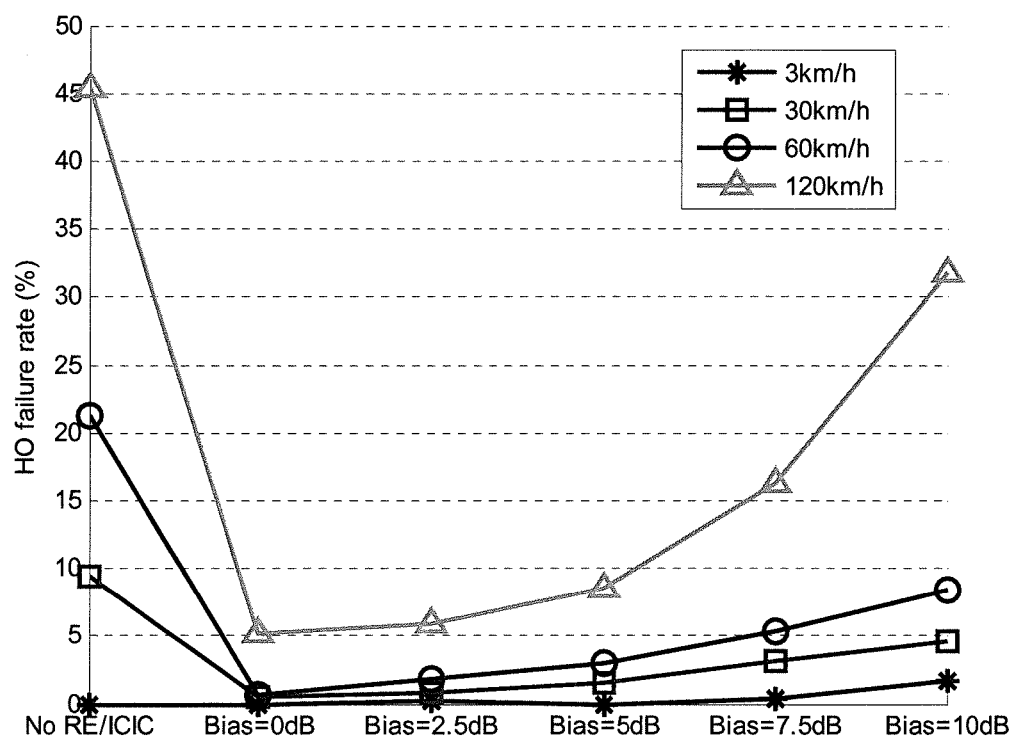
FIG. 9B: Pico-macro HO failure rate.
Figure 9C:
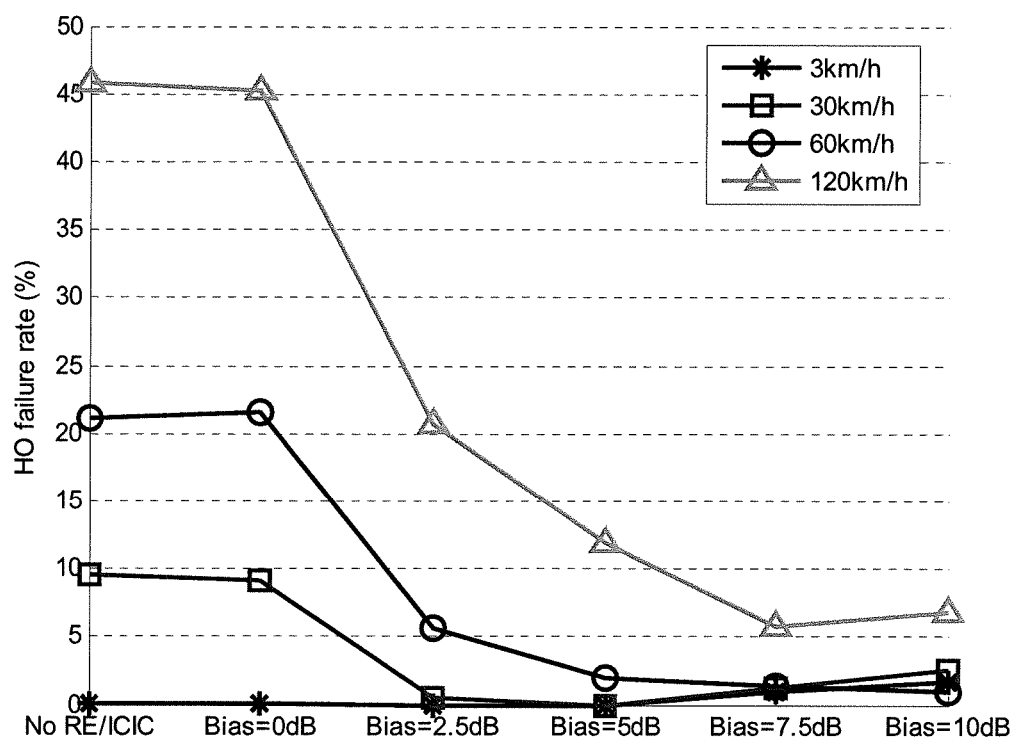
FIG. 9C: Macro-pico HO failure rate.
Figure 9D:
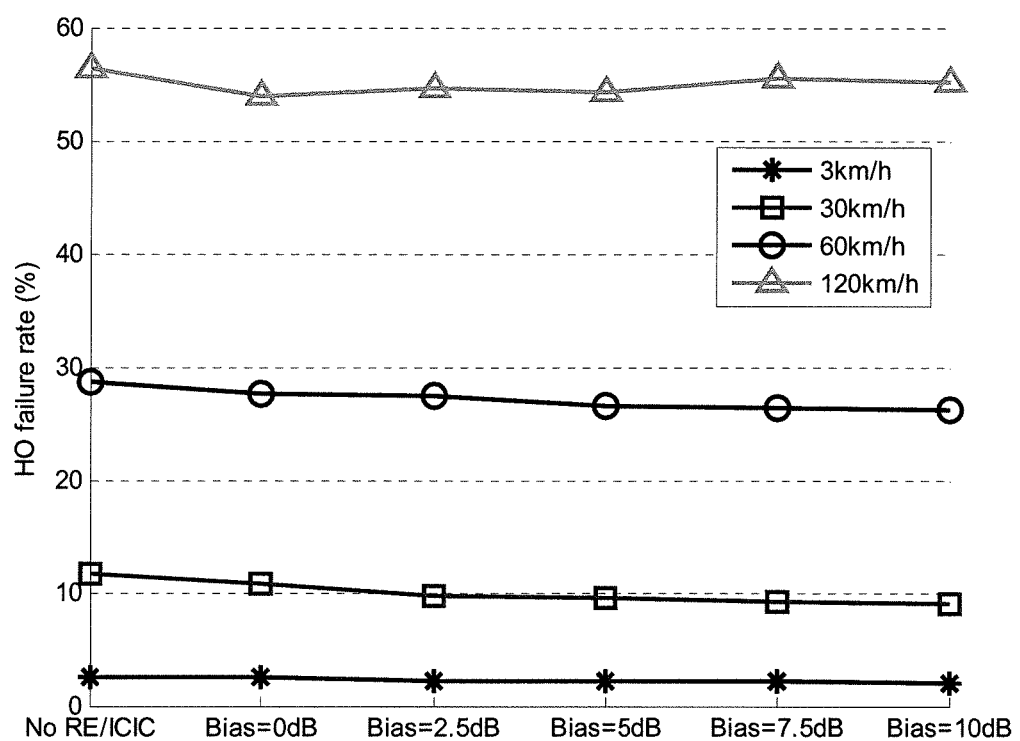
FIG. 9D: Pico-pico HO failure rate.
Figure 9E:
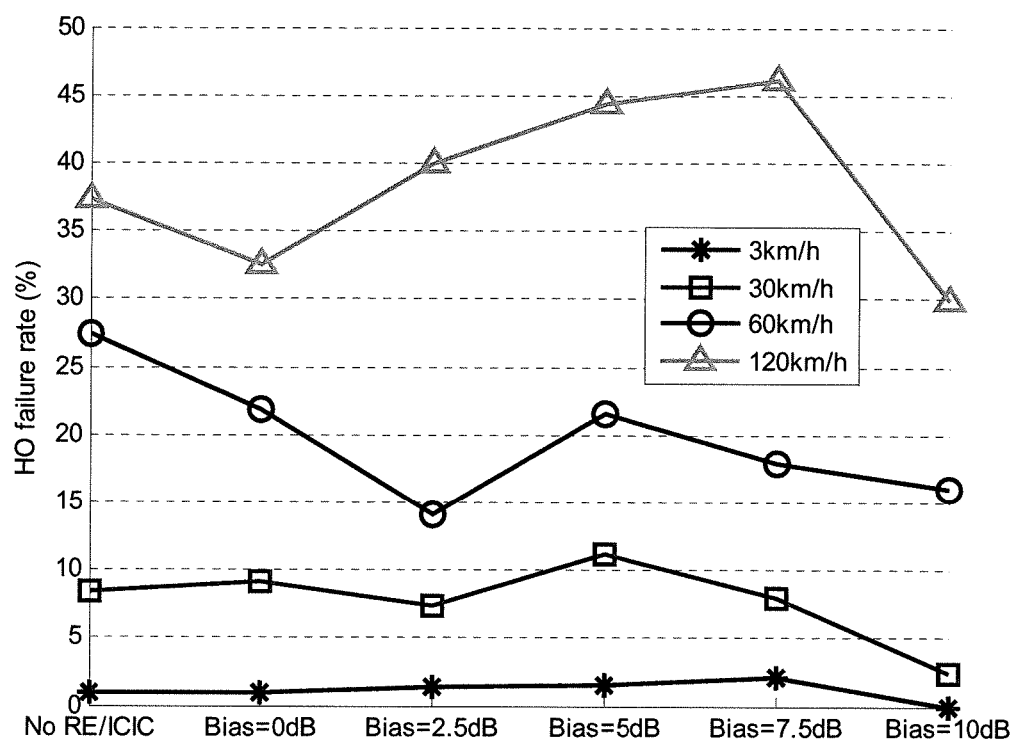
FIG. 9E: Macro-macro HO failure rate.
Figure 9F:
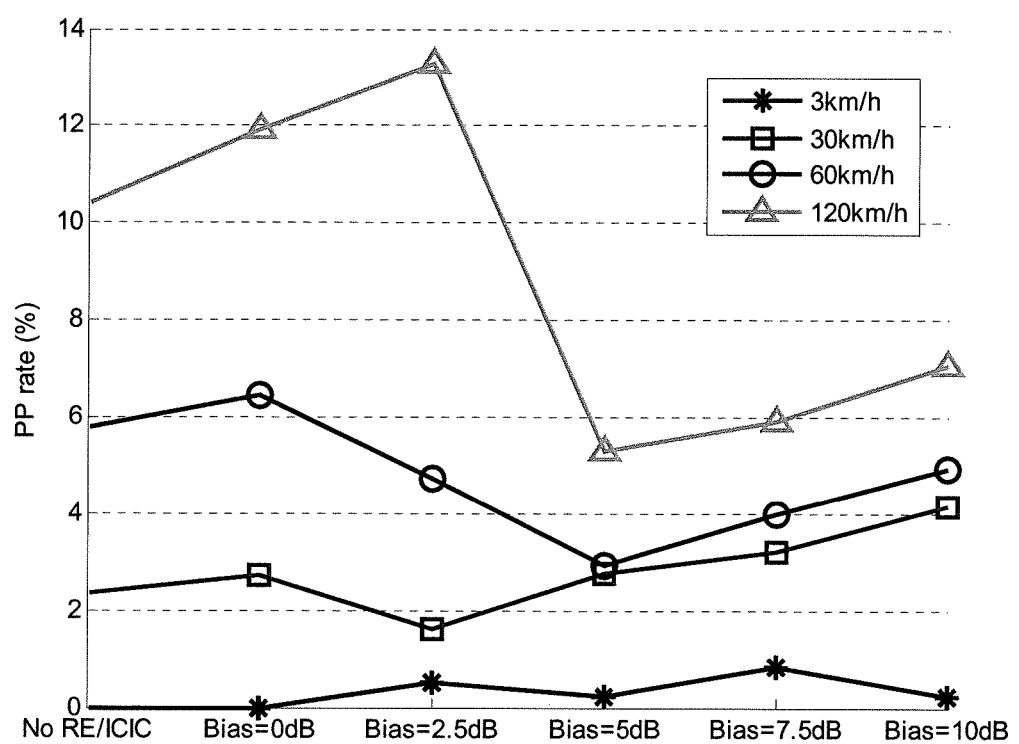
FIG. 9F: Overall PP rate.

FIG. 9F shows the overall PP rate versus the bias value. Interestingly, there are also optimal bias values to obtain the minimum PP rates with different velocities. This means that increasing the pico coverage area by range expansion does not necessarily increase the oscillation in cell selection. From Eq. (2), we note that changing the bias simply corresponds to changing the HO boundary. In terms of the minimization of the cell oscillation, there are optimal bias values which give the optimal HO boundaries for the current fading environment. These optimal bias values obviously depend on the HO hysteresis a, as shown in Eq. (2), and other HO/system parameters—TTT and transmit power, for example.

Range Expansion and Dynamic-ICIC

Figure 10A:
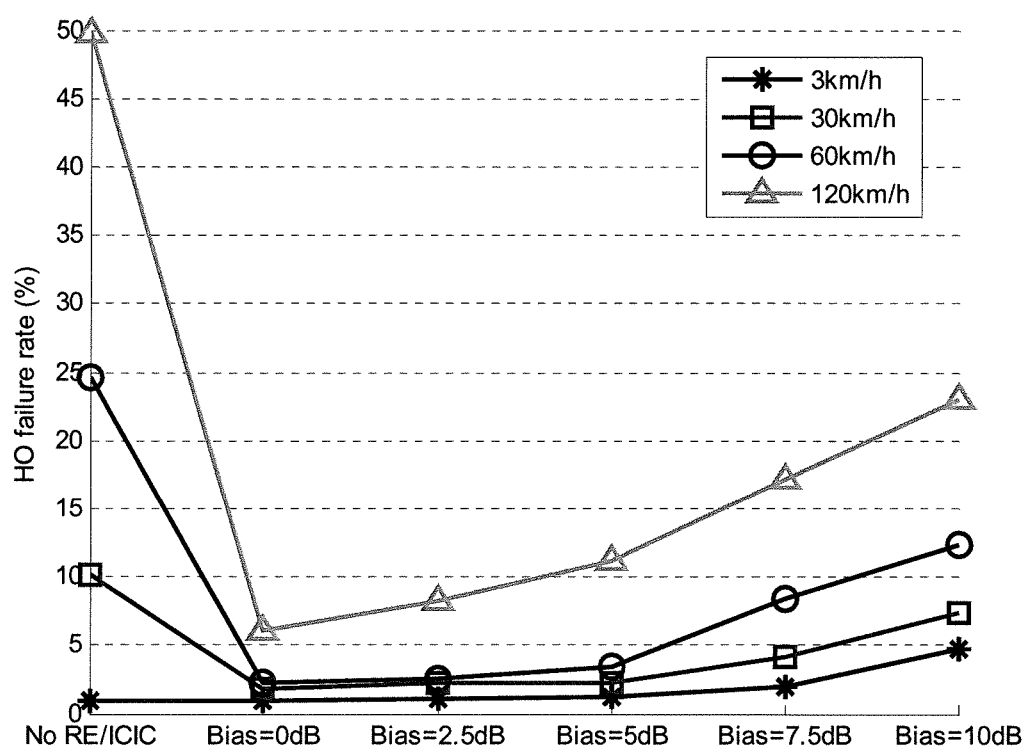
FIG. 10A: Overall HO failure rate.
Figure 10B:
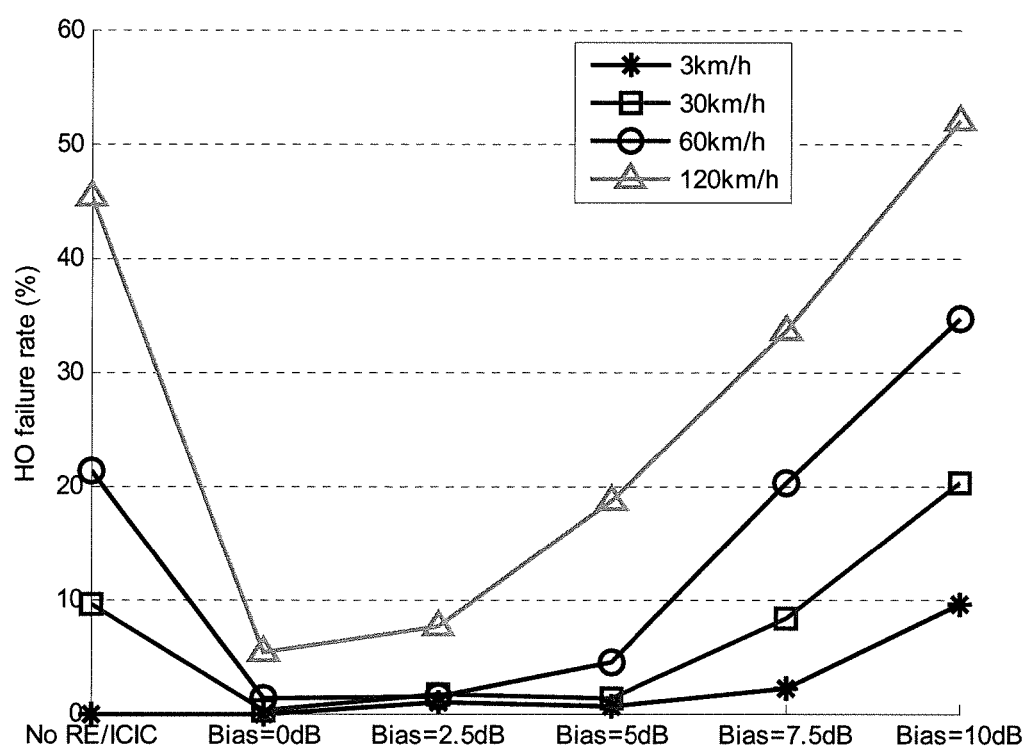
FIG. 10B: Pico-macro HO failure rate.
Figure 10C:
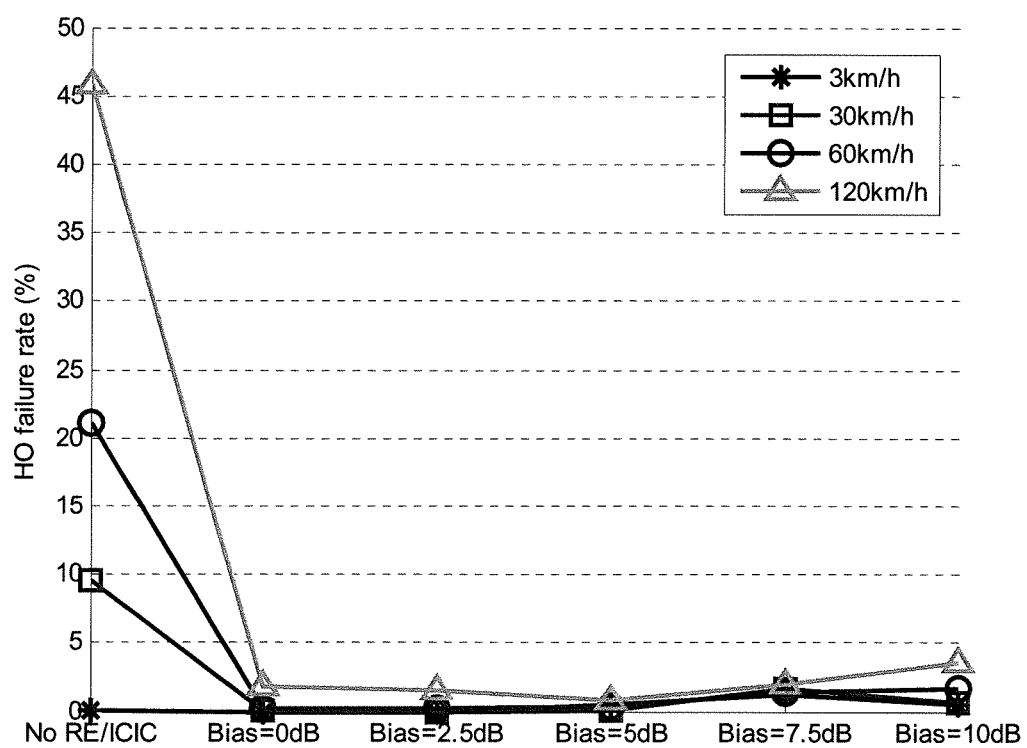
FIG. 10C: Macro-pico HO failure rate.
Figure 10D:
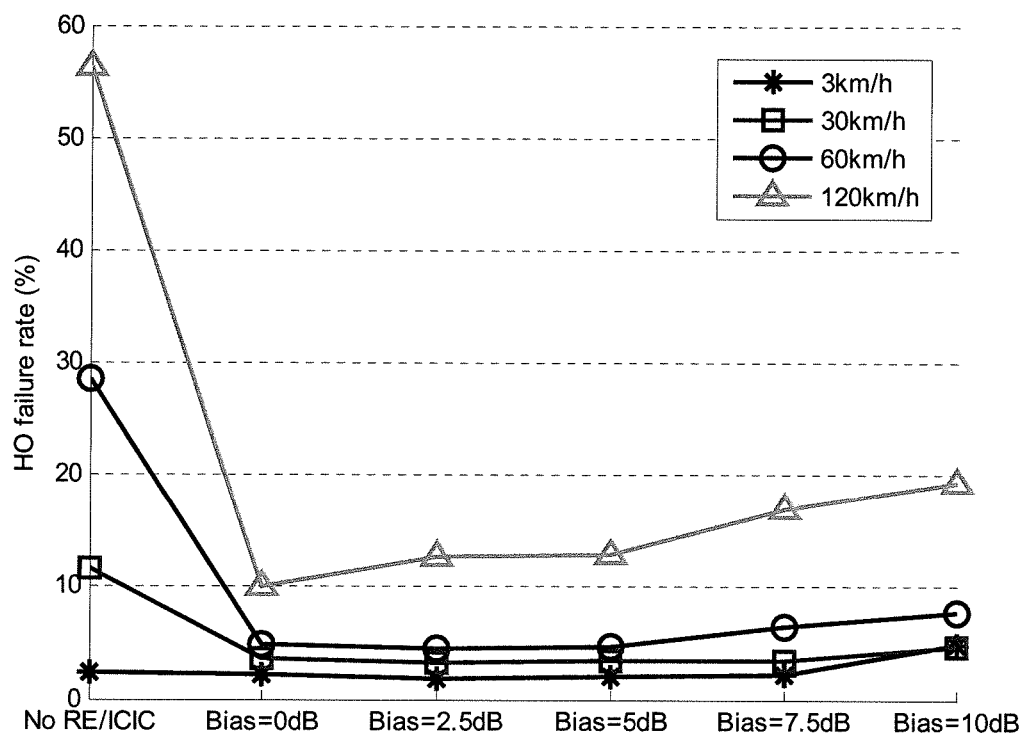
FIG. 10D: Pico-pico HO failure rate.
Figure 10E:
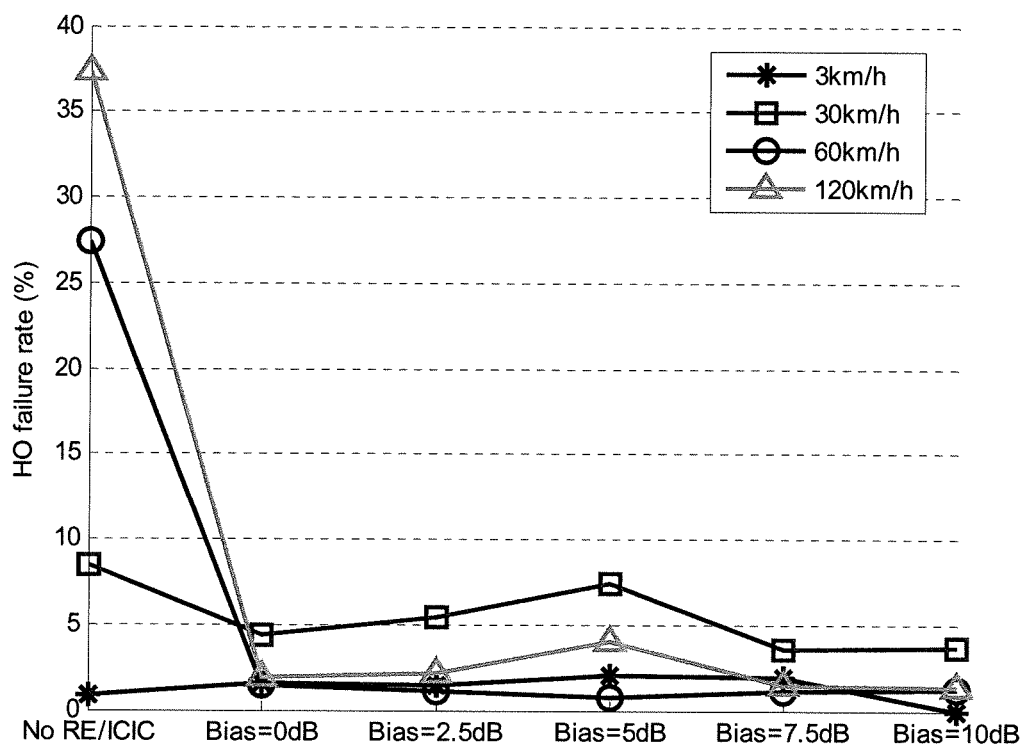
FIG. 10E: Macro-macro HO failure rate.

In view of the defect of the Static-ICIC in combating the intra-layer interference, the Dynamic-ICIC is adopted according to the invention in order to improve the HO performance. The simulation results are given in FIG. 10, where the same configurations are used as FIG. 9 for comparison. In FIG. 10A, one can see the significant improvement in the overall HO failure rate in comparison with the results obtained from the Static-ICIC (FIG. 9A). This is because not only the inter-layer HOs (FIGS. 10B and 10C) but also the intra-layer HOs (FIGS. 10D and 10E) benefit from the Dynamic-ICIC. Another interesting fact is that, unlike in the macro-pico HO with Static-ICIC shown in FIG. 9C, increasing the bias value does not decrease the HO failure rate any more in the Dynamic-ICIC case given in FIG. 10C. The reason is that the signal quality of the serving cell has already been significantly improved by using Dynamic-ICIC when initiating HO, making any further improvement by shifting the HO boundary to an earlier moment only marginal, whereas in the case of Static-ICIC the reduction in failure rate of macro-pico HOs mainly is due to the HO boundary shift. As a result, the overall HO failure rates in FIG. 10A reach their minima at the bias of zero with Dynamic-ICIC, which is distinct from the Static-ICIC case.

Figure 10F:
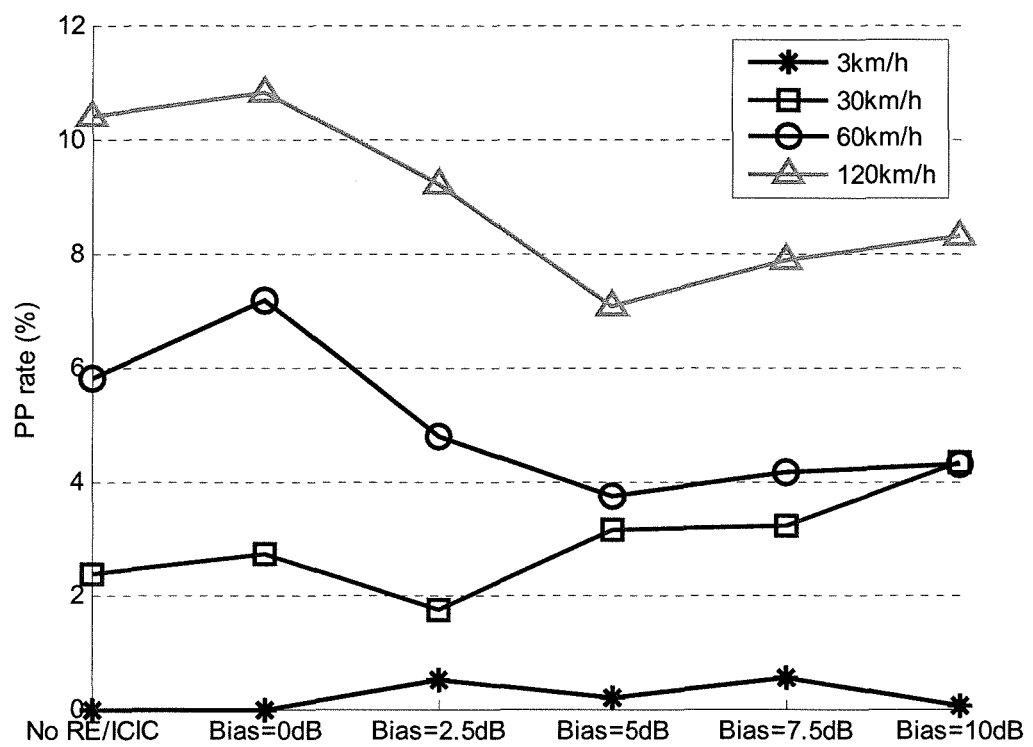
FIG. 10F: Overall PP rate.

In terms of the PP rates, both the Dynamic- and Static-ICIC give the similar trends as can be seen by comparing FIG. 10F to FIG. 9F. The results reveal that choosing between Static- and Dynamic-ICIC does not influence the optimal HO boundaries to minimize the PP rates.

Comparison to the Existing Scheme

In Ref [7], a Mobility-Based (MB)-ICIC is proposed to enhance the HO performance. In addition to the traditional Static-ICIC, where the macro cells leave certain subframe as blank, the pico cells will also configure ABSs so that macro cells can schedule their high-speed UEs (>=60 km/h) in these pico ABSs.

Basically, the MB-ICIC is a static approach and it is targeted at reducing the failure rate of macro-pico HOs with high velocity. In this subsection, it will be compared the performance obtained in previous subsections with that of the MB-ICIC.

Figure 11A:
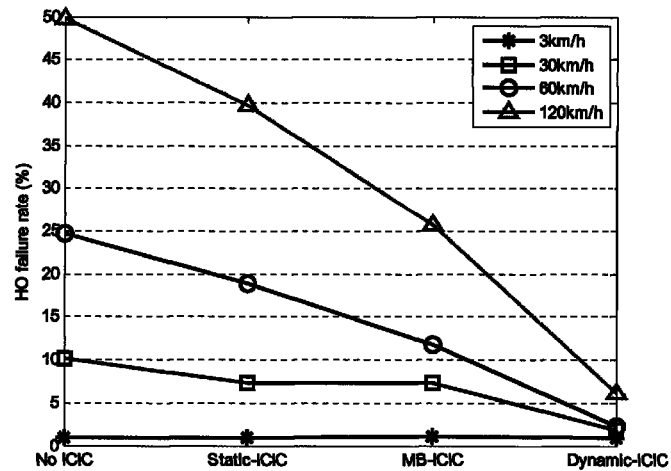
FIG. 11: HO failure rate comparison for different ICIC methods: (a) RE bias=0 dB; (b) RE bias=5 dB.
Figure 11B:
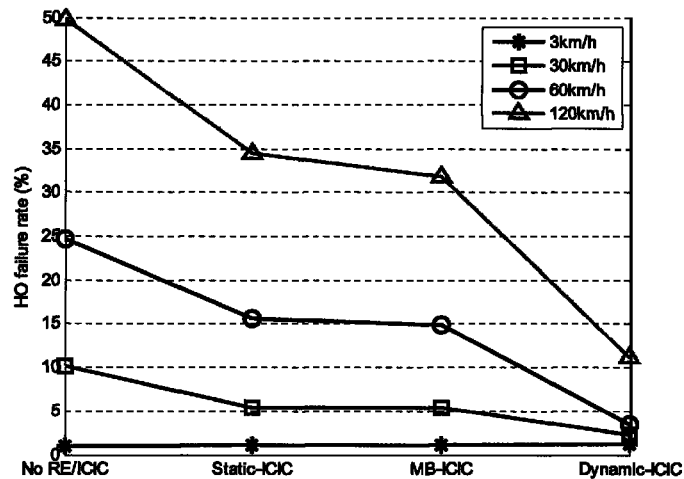

The comparison of HO failure rates are given in FIG. 11a and FIG. 11b, where the bias value is set to 0 dB and 5 dB, respectively. As shown, the MB-ICIC achieves limited performance improvement over the Static-ICIC. However, the Dynamic-ICIC provides significant performance gains. For example, when the bias value is 5 dB, the Dynamic-ICIC achieves 21% and 11% further reduction in HO failure rate in comparison to the MB-ICIC with the speed of 120 km/h and 60 km/h, respectively. This is because the lack of effective way of dealing with the intra-layer interference for both MB-ICIC and Static-ICIC make them suffer from high failure rates of macro-macro and pico-pico HOs, which dominates the overall performance. In contrast, the Dynamic-ICIC provides the universal treatment for inter- and intra-layer interference, improving the HO performance of all types as shown in FIGS. 10B to 10E.

Finally, the impacts of Static/Dynamic/MB-ICIC on the HO performance according to different HO types will be summarised in Table III.

TABLE III

Impacts of ICIC on different HO types in a heterogeneous network.

| Methods | pico-macro | macro-pico | pico-pico | macro-macro |
|---|---|---|---|---|
| Static-ICIC | Positive | — | — | — |
| MB-ICIC | Positive | Positive | — | — |
| Dynamic-ICIC | Positive | Positive | Positive | Positive |

CONCLUSIONS

The impacts of the range expansion and interference coordination on mobility performance in a heterogeneous network have been investigated. The study is based on a field test activity where the RSRP values from the macro and pico cells have been recorded at various locations periodically. The obtained measurements are used as the inputs to the handover simulation model for the simulation of the handover failure rate and ping-pong rate. The simulation results reveal that range expansion as well as interference coordination could have distinct influences on different handover types in the HetNet. Range expansion shifts the HO initiating boundary from pico towards macro cells. Thus it helps improve the macro-pico HOs, but challenges the pico-macro HOs. Existing Static-ICIC only protects the pico UE in the expanded range, so it has limited ability to reduce the overall HO failure rate in the HetNet. The Dynamic-ICIC according the present invention enhances the mobility. The Dynamic-ICIC can be executed between any two serving and neighboring cells and it only happens on demand. Through Dynamic-ICIC, the victim UE can be scheduled on the subframes protected from the strongest interferer. The simulation shows that the Dynamic-ICIC reduces the failure rate of all HO types, and hence improves the overall mobility performance significantly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES

[1] A. Damnjanovic, J. Montojo, Y. Wei, T. Ji, T. Luo, M. Vajapeyam, T. Yoo, O. Song, and D. Malladi, "A survey on 3GPP heterogeneous networks," *IEEE Wireless Communications*, vol. 18, no. 3, pp. 10-21, 2011.

[2] S.-P. Yeh, S. Talwar, G. Wu, N. Himayat, and K. Johnsson, "Capacity and coverage enhancement in heterogeneous networks," *IEEE Wireless Communications*, vol. 18, no. 3, pp. 32-38, 2011.

[3] R. Y. Kim, I. Jung, X. Yang, and C.-C. Chou, "Advanced handover schemes in imt-advanced systems [WiMAX/LTE update]," *IEEE Communications Magazine*, vol. 48, no. 8, pp. 78-85, 2010.

[4] Y. Lee, B. Shin, J. Lim, and D. Hong, "Effects of time-to-trigger parameter on handover performance in SON-based LTE systems," in *Proc. 16th Asia-Pacific Conf. Communications (APCC)*, 2010, pp. 492-496.

[5] K. Dimou, M. Wang, Y. Yang, M. Kazmi, A. Larmo, J. Pettersson, W. Muller, and Y. Timner, "Handover within 3GPP LTE: Design principles and performance," in *Proc. IEEE 70th Vehicular Technology Conf. Fall (VTC 2009-Fall)*, 2009, pp. 1-5.

[6] Z. Liu, P. Hong, K. Xue, and M. Peng, "Conflict avoidance between mobility robustness optimization and mobility load balancing," in *Proc. IEEE Global Telecommunications Conf. (GLOBECOM 2010)*, 2010, pp. 1-5.

[7] D. Lopez-Perez, I. Guvenc, and X. Chu, "Mobility enhancements for heterogeneous networks through interference coordination," in *Proc. IEEE Wireless Communications and Networking Conf. Workshops (WCNCW)*, 2012, pp. 69-74.

[8] R. Madan, J. Borran, A. Sampath, N. Bhushan, A. Khandekar, and T. Ji, "Cell association and interference coordination in heterogeneous LTE-A cellular networks," *IEEE J. Sel. Areas Commun.*, vol. 28, no. 9, pp. 1479-1489, 2010.

[9] I. Guvenc, "Capacity and fairness analysis of heterogeneous networks with range expansion and interference coordination," *IEEE Communications Letters*, vol. 15, no. 10, pp. 1084-1087, 2011.

[10] I. Guvenc, M.-R. Jeong, I. Demirdogen, B. Kecicioglu, and F. Watanabe, "Range expansion and inter-cell interference coordination (ICIC) for picocell networks," in *Proc. IEEE Vehicular Technology Conf. (VTC Fall)*, 2011, pp. 1-6.

[11] Y. Wang and K. I. Pedersen, "Performance analysis of enhanced intercell interference coordination in LTE-advanced heterogeneous networks," in *Proc. IEEE 75th Vehicular Technology Conf. (VTC Spring)*, 2012, pp. 1-5.

[12] D. Aziz and R. Sigle, "Improvement of LTE handover performance through interference coordination," in *Proc. IEEE 69th Vehicular Technology Conf. VTC Spring 2009*, 2009, pp. 1-5.

[13] G. Hui and P. Legg, "LTE handover optimisation using uplink ICIC," in *Proc. IEEE 73rd Vehicular Technology Conf. (VTC Spring)*, 2011, pp. 1-5.

[14] 3GPP, "Evolved universal terrestrial radio access (e-utra) and evolved universal terrestrial radio access network (e-utran); overall description (TS 36.300)," July 2012.

[15] 3GPP, "Evolved universal terrestrial radio access (e-utra); physical layer; measurements (TS 36.214)," April 2011.

[16] 3GPP, "Evolved universal terrestrial radio access (e-utra); radio resource control (RRC); protocol specification (TS 36.331)," July 2011.

[17] 3GPP, "Evolved universal terrestrial radio access (e-utra); mobility enhancements in heterogeneous networks (TR 36.839)," February 2012.

[18] 3GPP, "Evolved universal terrestrial radio access (e-utra); requirements for support of radio resource management (TS 36.133)," June 2011.

[19] 3GPP, Working Group Radio Layer 1, "Document R1-104968: Summary of the Description of Candidate eICIC Solutions", available at http://www.3gpp.org/ftp/tsg_ran/wg1_rl1/TSGR1_62/Docs/R1-104968.zip, August 2010.

The invention claimed is:

1. A handover method, the method comprising the steps of:
   (1a) detecting, at a serving node, signal quality of a signal transmitted from the serving node to a user equipment (UE) being worse than a predefined threshold;
   (1b) identifying, at the serving node, node(s) transmitting to the UE the strongest signals interfering with signals being transmitted to the UE by the serving node;
   (1c) sending, by the serving node, a request for starting an inter-cell interference coordination scheme to the node(s) identified in step (1b);
   (1d) rescheduling, by the node(s) identified in step (1b), users currently being served by the node(s) identified in step (1b) so as to reserve a part of resources according to the inter-cell interference coordination scheme such that the interference, including the control channel interference, is mitigated;
   (1e) informing, by the node(s) identified in step (1b), the serving node of the UE; which resources have been reserved in step (1d);
   (1f) scheduling, by the serving node, the UE to the resources reserved in step (1d);
   (1g) starting, by the serving node, handover of the UE from the serving node to a target node; and
   (1h) completing the handover of the UE;
   wherein step (1h) comprises the steps of:
   (1h1) reserving, at the serving node, the resources identified in step (1d) such that the interference, including the control channel interference, from the serving node to the UE is mitigated;
   (1h2) synchronizing the UE to the target node;
   (1h3) scheduling, by the target node, the UE to the resources reserved in step (1d); and
   (1h4) releasing, after completing the handover in accordance to step (1h), the resources reserved in step (1d), by the node having acted as serving node during the preceding steps; and/or (1h5) releasing, after completing the handover in accordance to step (1h), the resources reserved in step (1d), by the interfering nodes not involved in the handover process.

2. The method of claim 1, wherein before executing the steps (1a) to (1g), the following steps are performed:
   (2a) detecting, by the user equipment (UE), the signal quality of the signal transmitted from the serving node, the signal quality considering the degree of interference of the signal transmitted by the serving node with signal(s) transmitted by neighboured nodes;
   (2b) repeating step (2a) as long as the detected signal quality is better than a predefined threshold;
   (2c) identifying, by the UE, the node(s) transmitting to the UE the strongest signals interfering with the signals being transmitted to the UE by the serving node;
   (2d) sending, by the UE, a message to the serving node, the message comprising information about the signal quality being worse than a predefined threshold and the node(s) being identified in step (2c) as transmitting the strongest interference signals;
   (2e) receiving, at the serving node, the message sent by the UE in step (2d); and
   wherein both, step (1a) of detecting the signal quality and step (1b) of identifying node(s) sending interfering signals, comprise the step of:
   (2f) evaluating, at the serving node, the message received according to step (2e).

3. The method of claim 2, wherein the target node is one of the node(s) identified in step (2c) as transmitting the strongest interference signals.

4. The method of claim 2, wherein step (2c) of identifying, by the UE, the node(s) transmitting to the UE the strongest signals comprises a step of:
   measuring the reference signal received power (RSRP) from the neighbouring nodes.

5. The method of claim 1, wherein the signal quality is the signal-to-interference-plus-noise ratio (SINR).

6. The method of claim 1, wherein step (1c) of sending a request is performed via a direct interface between two transmitting nodes.

7. The method of claim 1, wherein the serving node is an eNodeB.

8. The method of claim 1, wherein the inter-cell interference coordination scheme is a frequency-domain technique or a power-control technique.

9. The method of claim 1, wherein the inter-cell interference coordination scheme is a time-domain technique.

10. The method of claim 9, wherein the inter-cell interference coordination scheme mitigates the interference in the control channel comprising periodically muting the node(s) identified in step (1b) at certain subframes in accordance to a muting pattern.

11. The method of claim 1, wherein the handover (HO) is an intra-layer HO.

12. A handover method, the method comprising the steps of:
   (1a) detecting, at a serving node, signal quality of a signal transmitted from the serving node to a user equipment (UE) being worse than a predefined threshold;
   (1b) identifying, at the serving node, node(s) transmitting to the UE the strongest signals interfering with signals being transmitted to the UE by the serving node;
   (1c) sending, by the serving node, a request for starting an inter-cell interference coordination scheme to the node(s) identified in step (1b);
   (1d) rescheduling, by the node(s) identified in step (1b), users currently being served by the node(s) identified in step (1b) so as to reserve a part of resources according to the inter-cell interference coordination scheme such that the interference, including the control channel interference, is mitigated;
(1e) informing, by the node(s) identified in step (1b), the serving node of the UE, which resources have been reserved in step (1d);
(1f) scheduling, by the serving node, the UE to the resources reserved in step (1d);
(1g) starting, by the serving node, the handover of the UE from the serving node to a target node; and
(1h) completing the handover of the UE,
wherein step (1h) comprises the steps of:
(1h1) synchronizing the UE to the target node;
(1h2) releasing the resources reserved in step (1d), by the target node; and/or (1h3) releasing the resources reserved in step (1d), by the interfering nodes not involved in the handover process;
(1h4) identifying, at the target node, node(s) transmitting to the UE the strongest signals interfering with the signals being transmitted to the UE by the target node;
(1h5) sending, by the target node, a request for starting an inter-cell interference coordination scheme to the node(s) identified in step (1h4);
(1h6) rescheduling, by the node(s) identified in step (1h4), users currently being served by the nodes identified in step (1h4) so as to reserve a part of resources according to the inter-cell interference coordination scheme such that the interference, including the control channel interference, is mitigated;
(1h7) informing, by the node(s) identified in step (1h4), the target node of the UE, which resources have been reserved in step (1h4);
(1h8) scheduling, by the target node, the UE to the resources reserved in step (1h6); and
(1h9) releasing, after completing the handover in accordance to step (1h), the resources reserved in step (1h6) in the node(s) identified in step (1h4).

13. A network comprising:
a plurality of nodes, wherein each of the nodes is configured for:
sending, after receiving a message from a user equipment (UE), a request for starting an inter-cell interference coordination scheme to interfering node(s) indicated in the message;
receiving information from the interfering node(s) as to resources being reserved in accordance to the inter-cell interference coordination scheme; and
scheduling the UE to the resources reserved in accordance to the inter-cell interference coordination scheme;
wherein each of the nodes is further configured for:
rescheduling, after receiving from another node a request for starting an inter-cell interference coordination scheme, users currently being served by the node so as to reserve a part of the resources in accordance to the inter-cell interference coordination scheme;
informing the other node; which resources have been reserved in accordance to the inter-cell interference coordination scheme;
scheduling, by a serving node, the UE to the resources reserved;
starting, by the serving node, handover of the UE from the serving node to a target node; and
completing the handover of the UE by reserving, at the serving node, the resources identified such that the interference, including the control channel interference, from the serving node to the UE is mitigated; synchronizing the UE to the target node; scheduling, by the target node, the UE to the resources reserved; releasing, after completing the handover, the resources reserved, by the node having acted as serving node during the preceding steps; and/or releasing, after completing the handover, the resources reserved, by the interfering nodes not involved in the handover process.

14. A network comprising:
a plurality of nodes, wherein each of the nodes is configured for:
sending, after receiving a message from a user equipment (UE), a request for starting an inter-cell interference coordination scheme to interfering node(s) indicated in the message;
receiving information from the interfering node(s) as to resources being reserved in accordance to the inter-cell interference coordination scheme; and
scheduling the UE to the resources reserved in accordance to the inter-cell interference coordination scheme;
wherein each of the nodes is further configured for:
rescheduling, after receiving from another node a request for starting an inter-cell interference coordination scheme, users currently being served by the node so as to reserve a part of the resources in accordance to the inter-cell interference coordination scheme;
informing the other node; which resources have been reserved in accordance to the inter-cell interference coordination scheme;
scheduling, by a serving node, the UE to the resources reserved;
starting, by the serving node, handover of the UE from the serving node to a target node; and
completing the handover of the UE by synchronizing the UE to the target node; releasing the resources reserved, by the target node and/or releasing the resources reserved, by the interfering nodes not involved in the handover process; identifying, at the target node, node(s) transmitting to the UE the strongest signals interfering with the signals being transmitted to the UE by the target node; sending, by the target node, a request for starting an inter-cell interference coordination scheme to the node(s) identified as transmitting the strongest interference signals; rescheduling, by the nodes identified, users currently being served by the nodes identified so as to reserve a part of the resources according to the inter-cell interference coordination scheme such that the interference, including the control channel interference, is mitigated; informing, by the nodes identified, the target node of the UE; which resources have been reserved; scheduling, by the target node, the UE to the resources reserved; and releasing, after completing the handover, the resources reserved in the node(s).

15. The network of claim 14, wherein each of the nodes is further configured for:
receiving, from the user equipment (UE) being served by the node, the message, the message comprising:
information about the signal quality of the signal transmitted from the node to the UE being worse than a predefined threshold, and
indication of interfering node(s) identified by the UE as transmitting the strongest signals interfering with the signal transmitted by the node serving the UE.

16. A mobile radio system, comprising:
the network according to claim 14; and
one or more user equipment(s) configured for:
- detecting signal quality of a signal transmitted from a node serving the UE, the signal quality considering the degree of interference of the signal transmitted from the node serving the UE with signal(s) transmitted by other node(s);
- identifying node(s) transmitting to the UE the strongest signals interfering with the signals being transmitted to the UE by the node serving the UE; and
- sending, upon detecting a signal quality being worse than a predefined threshold, the message to the node serving UE, the message comprising information about the signal quality being worse than a predefined threshold and the node(s) being identified as transmitting the strongest signals interfering with the signals transmitted by the node serving the UE.

\* \* \* \* \*